United States Patent
Tanaka

(10) Patent No.: US 9,879,624 B2
(45) Date of Patent: *Jan. 30, 2018

(54) CONTROLLING DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Satoru Tanaka, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/890,473

(22) PCT Filed: May 14, 2013

(86) PCT No.: PCT/JP2013/063430
§ 371 (c)(1),
(2) Date: Nov. 11, 2015

(87) PCT Pub. No.: WO2014/184871
PCT Pub. Date: Nov. 20, 2014

(65) Prior Publication Data
US 2016/0090929 A1 Mar. 31, 2016

(51) Int. Cl.
*F02D 43/00* (2006.01)
*F02D 41/00* (2006.01)
(Continued)

(52) U.S. Cl.
CPC .......... *F02D 41/0055* (2013.01); *F02D 11/02* (2013.01); *F02D 13/0226* (2013.01);
(Continued)

(58) Field of Classification Search
CPC ............. F02D 41/0055; F02D 41/3005; F02D 41/0007; F02D 41/0002; F02D 41/1497;
(Continued)

(56) References Cited

U.S. PATENT DOCUMENTS 5,628,290 A 5/1997 Iida et al.
5,727,528 A 3/1998 Hori et al.
(Continued)

FOREIGN PATENT DOCUMENTS

JP H11-022609 A 1/1999
JP 2002-303177 A 10/2002
(Continued)

OTHER PUBLICATIONS

U.S. Patent and Trademark Office, Non-Final Office Action in U.S. Appl. No. 14/903,385 dated Sep. 15, 2017, 24 pages.

*Primary Examiner* — Hai Huynh
(74) *Attorney, Agent, or Firm* — Andrews Kurth Kenyon LLP

(57) ABSTRACT

In response to decrease of a requested torque to a reference value or smaller, a value of a virtual air-fuel ratio that is used in calculation of a target air amount for achieving the requested torque is changed from a first air-fuel ratio to a second air-fuel ratio that is leaner than the first air-fuel ratio. The target air amount is calculated backwards from the requested torque by using the virtual air-fuel ratio. After the value of the virtual air-fuel ratio is changed from the first air-fuel ratio to the second air-fuel ratio, the target air-fuel ratio is switched from the first air-fuel ratio to the second air-fuel ratio. A target EGR rate is calculated by using the virtual air-fuel ratio. The target EGR rate is preferably determined by minimum value selection between a first target value of an EGR rate that is calculated by using the virtual air-fuel ratio, and a second target value of the EGR rate that is calculated by using the target air-fuel ratio.

9 Claims, 8 Drawing Sheets

(51) Int. Cl.
*F02D 21/08* (2006.01)
*F02D 41/12* (2006.01)
*F02D 41/14* (2006.01)
*F02P 5/152* (2006.01)
*F02D 11/02* (2006.01)
*F02D 13/02* (2006.01)
*F02D 41/30* (2006.01)
*F02P 5/04* (2006.01)

(52) U.S. Cl.
CPC ......... *F02D 21/08* (2013.01); *F02D 41/0002* (2013.01); *F02D 41/0005* (2013.01); *F02D 41/0007* (2013.01); *F02D 41/12* (2013.01); *F02D 41/1497* (2013.01); *F02D 41/3005* (2013.01); *F02P 5/045* (2013.01); *F02P 5/1521* (2013.01); *F02D 2021/083* (2013.01); *F02D 2041/001* (2013.01); *F02D 2041/0017* (2013.01); *Y02T 10/18* (2013.01); *Y02T 10/42* (2013.01); *Y02T 10/46* (2013.01); *Y02T 10/47* (2013.01)

(58) Field of Classification Search
CPC .. F02D 41/12; F02D 41/0005; F02D 13/0226; F02D 21/08; F02D 11/02; F02D 2021/083; F02D 2041/001; F02D 2041/0017; F02P 5/045; F02P 5/1521; Y02T 10/18; Y02T 10/42; Y02T 10/47
USPC ......... 123/406.23, 406.24, 406.48, 436, 672, 123/568.21; 701/103–105, 108, 110
See application file for complete search history.

(56) References Cited

U.S. PATENT DOCUMENTS

| | | |
|---|---|---|
| 6,009,851 A | 1/2000 | Iida et al. |
| 6,089,206 A | 7/2000 | Suzuki et al. |
| 7,512,479 B1 | 3/2009 | Wang |
| 2002/0124831 A1 | 9/2002 | Kondo |
| 2005/0051147 A1 | 3/2005 | Nagaishi et al. |
| 2016/0153373 A1* | 6/2016 | Yoshizaki ............... F02D 41/10 123/406.48 |

FOREIGN PATENT DOCUMENTS

| | | |
|---|---|---|
| JP | 2002339778 A | 11/2002 |
| JP | 2005090279 A | 4/2005 |

* cited by examiner

CONTROLLING DEVICE FOR INTERNAL COMBUSTION ENGINE

CROSS-REFERENCE TO RELATED APPLICATION

This is a national phase application based on the PCT International Patent Application No. PCT/JP2013/063430 filed May 14, 2013, the entire contents of which are incorporated herein by reference.

TECHNICAL FIELD

The present invention relates to a controlling device that performs integrated control of an air amount, a fuel supply amount, an ignition timing, and an EGR rate of an internal combustion engine that is configured to be capable of switching an air-fuel ratio that is used for operation between at least two air-fuel ratios.

BACKGROUND ART

Japanese Patent Laid-Open No. 2002-303177 discloses technology (hereunder, referred to as "related art") relating to throttle control in an internal combustion engine equipped with an electronic throttle. In the internal combustion engine of the related art, the requested torque which should be generated by combustion of the internal combustion engine is calculated based on the accelerator operation of a driver and the like, and the target in-cylinder charging air amount is calculated based on the requested torque, and the target intake pressure is calculated based on the target in-cylinder charging air amount and engine speed. Subsequently, the target degree of throttle opening is calculated based on the target in-cylinder charging air amount and the target intake pressure, and the actuator of the throttle is controlled based on the target degree of throttle opening.

Further, the internal combustion engine of the above described related art is equipped with an EGR device for recirculating part of the exhaust gas to the intake side. An exhaust gas recirculation amount (an EGR flow rate) is a parameter of the variation factor of the intake pressure. Therefore, in the internal combustion engine of the above described related art, the target intake pressure is corrected by using an EGR flow rate.

Incidentally, there has been conventionally known an internal combustion engine capable of performing switching control of an air-fuel ratio such as switching from the operation by a theoretical air-fuel ratio to the operation by an air-fuel ratio leaner than the theoretical air-fuel ratio, or switching in the opposite way. Paying attention to the EGR control of the internal combustion engine like this, the EGR rate to be a target (the target EGR rate) is also switched with switching of the air-fuel ratio. However, even when the EGR rate to be the target is switched, the actual EGR rate (the real EGR rate) does not change immediately. This is because there arise a delay in response of an actuator (an EGR valve) that regulates the EGR rate, and a delay in response corresponding to the volumetric capacity of the EGR route from the EGR valve to the throttle. If air with an EGR rate higher than the target EGR rate is taken into the cylinder due to the delays in response, there arises the risk of occurrence of a misfire and an engine stall.

CITATION LIST

Patent Literature

Patent Literature 1: Japanese Patent Laid-Open No. 2002-303177

SUMMARY OF INVENTION

The present invention has been conceived in view of the above described problems, and a problem of the present invention is, in an internal combustion engine that is configured to be capable of switching an air-fuel ratio that is used for operation between at least two air-fuel ratios, to switch the air-fuel ratio with a high responsiveness while torque is changed smoothly in accordance with the request of the driver, and the EGR rate can be controlled with a high responsiveness.

The present invention can be applied to the configuration of a controlling device for an internal combustion engine. Hereunder, a general outline of a controlling device for an internal combustion engine according to the present invention will be described. However, as will be apparent from the contents of the present invention described below, the present invention can be applied to the procedures of a control method for an internal combustion engine and can also be applied to an algorithm of a program that is executed with a controlling device.

A controlling device according to the present invention adopts, as a control object, an internal combustion engine that has four kinds of actuators, and is configured to be capable of selecting an operation by a first air-fuel ratio and an operation by a second air-fuel ratio that is leaner than the first air-fuel ratio. The four kinds of actuators refer to a first actuator that changes an air amount, a second actuator that supplies fuel into a cylinder, a third actuator that ignites a mixture gas in the cylinder, and a fourth actuator that regulates an EGR rate. The first actuator includes a throttle, and a variable valve timing mechanism that changes a valve timing of an intake valve, and further, if the internal combustion engine is a turbocharging engine, the first actuator includes turbocharging property variable actuators that changes a turbocharging property of a turbocharger, more specifically, a variable nozzle and a wastegate valve. The second actuator is more specifically an injector that injects fuel, and includes a port injector that injects fuel into an intake port, and a cylinder injector that directly injects fuel into the cylinder. The third actuator is more specifically an ignition device. The fourth actuator is more specifically an EGR valve. The controlling device according to the present invention performs integrated control of an air amount, a fuel supply amount, an ignition timing and an EGR rate of the internal combustion engine by means of coordinated operations of these four kinds of actuators.

The controlling device according to the present invention can be embodied by a computer. More specifically, the controlling device according to the present invention can be constituted by a computer that is equipped with a memory in which a program that describes processing for realizing various functions is stored, and a processor that reads the program from the memory and executes the program. Functions that the controlling device according to the present invention is equipped with include, as functions for determining a target air amount, a target air-fuel ratio and a target EGR rate to be used in coordinated operations of the four kinds of actuators described above, a requested torque reception function, a target air-fuel ratio switching function, a target air amount calculation function, a virtual air-fuel ratio changing function, and a target EGR rate calculation function.

According to the requested torque reception function, a requested torque with respect to the internal combustion engine is received. The requested torque is calculated based on a signal that is responsive to the degree of opening of an accelerator pedal that is operated by the driver. In a case where the driver issues a deceleration request with respect to the internal combustion engine, a requested torque is obtained that decreases in accordance with the speed at which the driver releases the accelerator pedal. In a case where the driver issues an acceleration request with respect to the internal combustion engine, a requested torque is obtained that increases in accordance with the speed at which the driver depresses the accelerator pedal.

According to the target air amount calculation function, a target air amount for achieving the requested torque is calculated backwards from the requested torque. In calculation of the target air amount, a virtual air-fuel ratio that is a value corresponding to an air-fuel ratio is used as a parameter that provides a conversion efficiency of the air amount to torque. The virtual air-fuel ratio is variable, and is changed by the virtual air-fuel ratio changing function. According to the virtual air-fuel ratio changing function, the virtual air-fuel ratio that is the value corresponding to the air-fuel ratio is switched from a first air-fuel ratio to a second air-fuel ratio that is leaner than the first air-fuel ratio in response to decrease of the requested torque to a reference value or smaller. That is to say, when the requested torque decreases to the reference value or smaller, an air-fuel ratio that is used in calculation of the target air amount is switched from the first air-fuel ratio to the second air-fuel ratio, prior to a target air-fuel ratio being switched from the first air-fuel ratio to the second air-fuel ratio. If the value of the requested torque is the same, the target air amount becomes smaller as the virtual air-fuel ratio is richer, and the target air amount becomes larger as the virtual air-fuel ratio is leaner. Note that the reference value with respect to torque may be a fixed value, but is preferably changed properly in accordance with engine speed of the internal combustion engine or the other conditions.

According to the target air-fuel ratio switching function, in a transitional period in which the requested torque decreases, the target air-fuel ratio is switched from the first air-fuel ratio to the second air-fuel ratio which is leaner than the first air-fuel ratio, after the virtual air-fuel ratio is changed from the first air-fuel ratio to the second air-fuel ratio which is leaner than the first air-fuel ratio in response to the requested torque decreasing to the reference value or smaller. A specific timing for switching the target air-fuel ratio from the first air-fuel ratio to the second air-fuel ratio is preferably a time point at which a difference between the target air amount and an estimated air amount becomes equal to or smaller than a threshold value. Further, the target air-fuel ratio may be switched from the first air-fuel ratio to the second air-fuel ratio at a time point when a fixed time period elapses after a value of a parameter is changed.

According to the target EGR rate calculation function, the virtual air-fuel ratio which is used in the target air amount calculation function is used in calculation of the target EGR rate. As described above, the virtual air-fuel ratio is variable, and is changed by the virtual air-fuel ratio changing function. According to the virtual air-fuel ratio changing function, the virtual air-fuel ratio is switched from a value corresponding to the first air-fuel ratio to a value corresponding to the second air-fuel ratio in response to decrease of the requested torque to the reference value or smaller.

That is to say, when the requested torque is decreased to the reference value or smaller, the target EGR rate is switched from the value that is calculated by using the first air-fuel ratio to the value that is calculated by using the second air-fuel ratio, prior to the target air-fuel ratio being switched from the first air-fuel ratio to the second air-fuel ratio.

The controlling device according to the present invention subjects the four kinds of actuator to coordinated operations based on the target air amount, the target air-fuel ratio and the target EGR rate determined by the above described processing. Functions that the controlling device of the present invention is equipped with include a first actuator control function, a second actuator control function, a third actuator control function and a fourth actuator control function as functions for performing coordinated operations based on the target air amount, the target air-fuel ratio, and the target EGR rate.

According to the first actuator control function, an operation amount of the first actuator is determined based on the target air amount. Further, operation of the first actuator is performed in accordance with the determined operation amount. The actual air amount changes so as to track the target air amount according to the operation of the first actuator.

According to the second actuator control function, a fuel supply amount is determined based on the target air-fuel ratio. Operation of the second actuator is then performed in accordance with the fuel supply amount that is determined.

According to the third actuator control function, an ignition timing for achieving the requested torque is determined based on a torque that is estimated based on the operation amount of the first actuator and the target air-fuel ratio, and the requested torque. Operation of the third actuator is then performed in accordance with the determined ignition timing. The actual air amount can be estimated based on the operation amount of the first actuator, and the torque can be estimated based on the estimated air amount and the target air-fuel ratio. Operation of the third actuator is performed by correcting an excessive amount of the estimated torque with respect to the requested torque by means of the ignition timing.

According to the fourth actuator control function, an operation amount of the fourth actuator is determined based on the target EGR rate. An operation of the fourth actuator is performed in accordance with the determined operation amount. By the operation of the fourth actuator, an actual EGR rate changes to follow the target EGR rate.

The aforementioned function with which the controlling device according to the present invention is equipped is a favorable function for restraining a misfire and an engine stall by avoiding excessive EGR in a case where the target EGR rate changes in a reducing direction at a time of switching the target air-fuel ratio from the first air-fuel ratio to the second air-fuel ratio which is leaner than the first air-fuel ratio. In order to restrain a misfire and an engine stall by avoiding the excessive EGR in a case where the target EGR rate changes in an increasing direction at the time of switching the target air-fuel ratio, further inclusion of the following functions is preferable.

According to a preferable mode, the target EGR rate calculation function includes a function of calculating a first target value of the EGR rate by using the virtual air-fuel ratio that is used in the target air amount calculation function, a function of calculating a second target value of the EGR rate by using the target air-fuel ratio, and a function of comparing the first target value and the second target value, and selecting a smaller one of the first target value and the second target value as the target EGR rate. As described above, when the requested torque decreases to the reference value or smaller, the virtual air-fuel ratio is switched from the first air-fuel ratio to the second air-fuel ratio, prior to the target air-fuel ratio being switched from the first air-fuel ratio to the second air-fuel ratio. Therefore, according to these additional functions included in the target EGR rate calculation function, in a transitional period in which the virtual air-fuel ratio is switched to the second air-fuel ratio prior to the target air-fuel ratio, the first target value is calculated by using the second air-fuel ratio which is the value of the virtual air-fuel ratio, and the second target value is calculated by using the first air-fuel ratio which is the value of the target air-fuel ratio. Subsequently, the first target value and the second target value are compared, and a smaller one of them is selected as the target EGR rate. Since the target air-fuel ratio in the transitional period is the first air-fuel ratio, in a case where the first target value is larger than the second target value, the second target value is selected as the target EGR rate, and thereby excessive EGR is avoided.

According to the controlling device according to the present invention, the functions described above are equipped, whereby in the transitional period in which the requested torque provided by the driver is decreasing, the air-fuel ratio is switched with a high responsiveness while torque is changed smoothly in accordance with the request of the driver, and the EGR rate can be controlled with a high responsiveness.

DESCRIPTION OF EMBODIMENTS

First Embodiment

Hereunder, a first embodiment of the present invention is described with reference to the drawings.

An internal combustion engine (hereinafter, referred to as "engine") which is a control object in the present embodiment is a spark-ignition type, four-cycle reciprocating engine. Further, the engine is a so-called "lean-burn engine" that is constructed so as to be capable of selecting between a stoichiometric mode (first operation mode) that performs operation according to a theoretical air-fuel ratio and a lean mode (second operation mode) that performs operation according to an air-fuel ratio that is leaner than the theoretical air-fuel ratio as operation modes of the engine.

An ECU (Electrical Control Unit) mounted in the vehicle controls operations of the engine by actuating various kinds of actuators that are provided in the engine. The actuators actuated by the ECU include a throttle and variable valve timing mechanism (hereunder, referred to as "VVT") as a first actuator that changes an air amount, an injector as a second actuator that supplies fuel into a cylinder, an ignition device as a third actuator that ignites an air-fuel mixture in a cylinder, and an EGR valve as a fourth actuator that regulates the EGR rate. The VVT is provided with respect to an intake valve. The injector is provided in an intake port. The ECU actuates these actuators to control operation of the engine. Control of the engine by the ECU includes switching of the operation mode from a stoichiometric mode to a lean mode, or from the lean mode to the stoichiometric mode.

Figure 1:
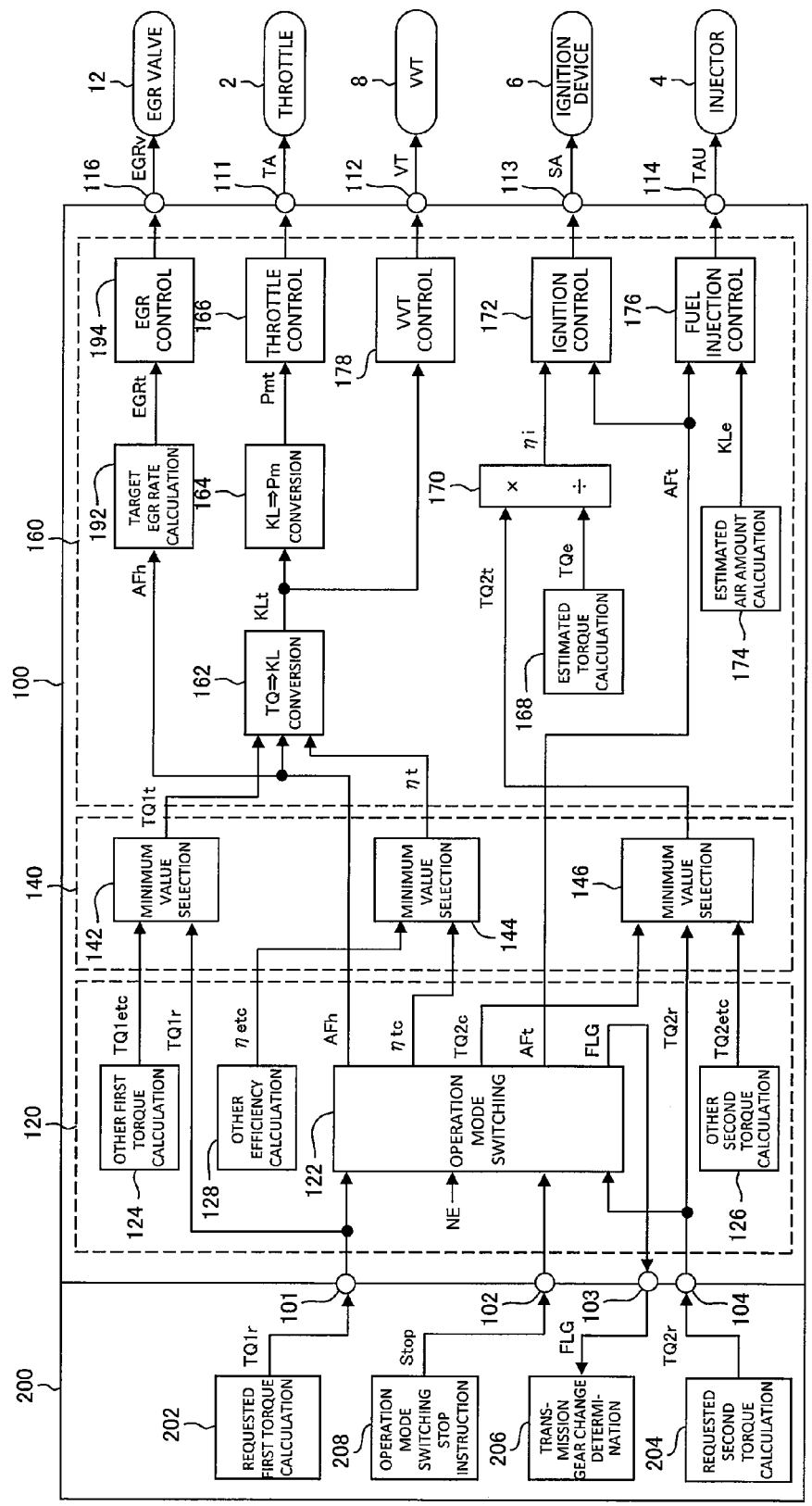
FIG. 1 is a block diagram illustrating a logic of a controlling device according to a first embodiment of the present invention.

In FIG. 1, the logic of the ECU according to the present embodiment is illustrated in a block diagram. The ECU includes an engine controller 100 and a powertrain manager 200. The engine controller 100 is a controlling device that directly controls the engine, and corresponds to the controlling device according to the present invention. The powertrain manager 200 is a controlling device that performs integrated control of the entire driving system that includes the engine, an electronically controlled automatic transmission, and also vehicle controlling devices such as a VSC and TRC. The engine controller 100 is configured to control operation of the engine based on signals received from the powertrain manager 200. The engine controller 100 and powertrain manager 200 are each realized by software. More specifically, the respective functions of the engine controller 100 and the powertrain manager 200 are realized in the ECU by reading programs stored in a memory and executing the programs using a processor. Note that in a case where the ECU is equipped with a multi-core processor, the engine controller 100 and the powertrain manager 200 can be assigned to respective different cores or core groups.

In the block showing the powertrain manager 200 in FIG. 1, among various functions that the powertrain manager 200 is equipped with, some of the functions relating to control of the engine are represented by blocks. An arithmetic unit is allocated to each of these blocks. A program corresponding to each block is prepared in the ECU, and the functions of the respective arithmetic units are realized in the ECU by executing the programs using a processor. Note that in the case where the ECU is equipped with a multi-core processor, the arithmetic units configuring the powertrain manager 200 can be distributed and assigned to a plurality of cores.

An arithmetic unit 202 calculates a requested first torque and sends the calculated value to the engine controller 100. In FIG. 1, the requested first torque is described as "TQ1r". The first torque is a torque of a kind with respect to which the responsiveness required of the engine is not high and which it is sufficient to realize in the near future and need not be realized immediately. The requested first torque is a requested value of the first torque that the powertrain manager 200 requests with respect to the engine, and corresponds to the requested torque in the present invention. A signal that is output in response to the state of the degree of opening of the accelerator pedal from an unshown accelerator position sensor is input to the arithmetic unit 202. The requested first torque is calculated based on the aforementioned signal. Note that the requested first torque is a shaft torque.

An arithmetic unit 204 calculates a requested second torque and sends the calculated value to the engine controller 100. In FIG. 1, the requested second torque is described as "TQ2r". The second torque is a torque of a kind with respect to which the urgency or priority is higher than the first torque and for which a high responsiveness is required of the engine. That is, the second torque is of a kind which is required to be realized immediately. The term "responsiveness" used here refers to the responsiveness when the torque is temporarily decreased. The requested second torque is a requested value of the second torque that the powertrain manager 200 requests with respect to the engine. The requested second torque that is calculated by the arithmetic unit 204 includes various kinds of torques requested from the vehicle control system, such as a torque requested for transmission control of the electronically controlled automatic transmission, a torque requested for traction control, and a torque requested for sideslip prevention control. While the first torque is a torque that the engine is required to generate stably or over an extended period, the second torque is a torque that the engine is required to generate suddenly or during a short period. Therefore, the arithmetic unit 204 outputs a valid value that is in accordance with the size of the torque that it is desired to realize only in a case where an event has actually arisen in which such a torque is required, and outputs an invalid value during a period in which such an event does not arise. The invalid value is set to a value that is larger than the maximum shaft torque that the engine can output.

An arithmetic unit 206 calculates a transmission gear ratio of the automatic transmission, and sends a signal indicating the transmission gear ratio to an unshown transmission controller. The transmission controller is realized as one function of the ECU, similarly to the powertrain manager 200 and the engine controller 100. A flag signal from the engine controller 100 is input to the arithmetic unit 206. In the drawings, the flag signal is described as "FLG". The flag signal is a signal that indicates that the state is one in which switching of the operation mode is being performed. During a period in which the flag signal is "on", the arithmetic unit 206 fixes the transmission gear ratio of the automatic transmission. That is to say, while switching of the operation mode is being performed, change of the transmission gear ratio by the automatic transmission is prohibited so that the operating state of the engine does not change to a large degree.

In response to a predetermined condition being satisfied, an arithmetic unit 208 sends a stop signal to the engine controller 100 that instructs the engine controller 100 to stop switching of the operation mode. In the drawings, the stop signal is described as "Stop". The predetermined condition is that a request to change the operating state of the engine to a large degree is output from the powertrain manager 200. For example, in a case where the transmission gear ratio of the automatic transmission is changed, and in a case where special requests regarding the ignition timing and the fuel injection amount are issued to the engine to warm up the catalyst, the stop signal is outputted from the arithmetic unit 208.

Next, the configuration of the engine controller 100 will be described. Interfaces 101, 102, 103 and 104 are arranged between the engine controller 100 and the powertrain manager 200. The interface 101 corresponds to requested torque reception means in the present invention. The requested first torque is passed to the engine controller 100 at the interface 101. The stop signal is passed to the engine controller 100 at the interface 102. The flag signal is passed to the engine controller 100 at the interface 103. The requested second torque is passed to the engine controller 100 at the interface 104.

In the block illustrating the engine controller 100 in FIG. 1, among the various functions with which the engine controller 100 is equipped, functions relating to coordinated operations of the four kinds of actuators, that is, a throttle 2 and a VVT 8 as a first actuator, an injector 4 as a second actuator, an ignition device 6 as a third actuator are represented with blocks, and an EGR valve 12 as a fourth actuator. An arithmetic unit is allocated to each of these blocks. A program corresponding to each block is prepared in the ECU, and the functions of the respective arithmetic units are realized in the ECU by executing the programs using a processor. Note that in the case where the ECU is equipped with a multi-core processor, the arithmetic units configuring the engine controller 100 can be distributed and assigned to a plurality of cores.

The configuration of the engine controller 100 is broadly divided into three large arithmetic units 120, 140 and 160. The large arithmetic unit 120 calculates values of various control parameters with respect to the engine. Target values of various control amounts with respect to the engine are included in the control parameters. In addition, a value calculated based on a requested value that is sent from the powertrain manager 200, and a value that is calculated within the large arithmetic unit 120 based on information relating to the operating state of the engine are included in the target values. Note that, while a requested value is a value of a control amount that is unilaterally requested from the powertrain manager 200 without taking the state of the engine into consideration, a target value is a value of a control amount that is set based on a realizable range that is decided depending on the state of the engine. The large arithmetic unit 120 is, more specifically, constituted by four arithmetic units 122, 124, 126, and 128.

The arithmetic unit 122 calculates, as control parameters for the engine, a target air-fuel ratio, a virtual air-fuel ratio, a target efficiency for switching, and a target second torque for switching. In the drawings, the target air-fuel ratio is described as "AFt", the virtual air-fuel ratio is described as "AFh", the target efficiency for switching is described as "ηtc", and the target second torque for switching is described as "TQ2c". The target air-fuel ratio is a target value of the air-fuel ratio to be realized by the engine, and is used for calculating a fuel injection amount. On the other hand, the virtual air-fuel ratio is a parameter that provides a conversion efficiency of the air amount to torque, and is used for calculating a target air amount. The target efficiency for switching is a target value of the ignition timing efficiency for switching of the operation mode, and is used for calculating the target air amount. The term "ignition timing efficiency" refers to the proportion of torque that is actually output with respect to the torque that can be output when the ignition timing is the optimal ignition timing. When the ignition timing is the optimal ignition timing, the ignition timing efficiency is 1 that is the maximum value thereof. Note that the term "optimal ignition timing" fundamentally refers to the MBT (minimum advance for best torque), and when a trace knock ignition timing is set, the term "optimal ignition timing" refers to the ignition timing that is located further on the retardation side among the MBT and the trace knock ignition timing. The target second torque for switching is a target value of the second torque for switching of the operation mode, and is used to switch the calculation of the ignition timing efficiency when switching the operation mode. Switching of the operation mode is executed by combining the values of these control parameters that are calculated with the arithmetic unit 122. The relation between the contents of the processing performed by the arithmetic unit 122 and switching of the operation mode will be described in detail later.

In addition to the requested first torque, the requested second torque, and the stop signal that are received from the powertrain manager 200, various kinds of information relating to the operating state of the engine such as engine speed is also input to the arithmetic unit 122. Among these, information for determining the timing for switching the operation mode is the requested first torque. The requested second torque and the stop signal are used as information for determining whether switching of the operation mode is permitted or prohibited. When the stop signal is inputted, and when the requested second torque of a valid value is inputted, the arithmetic unit 122 does not execute processing relating to switching the operation mode. Further, during switching of the operation mode, that is, while executing calculation processing for switching the operation mode, the arithmetic unit 122 sends the aforementioned flag signal to the powertrain manager 200.

The arithmetic unit 124 calculates, as a control parameter for the engine, a torque that is classified as a first torque among torques that are necessary for maintaining the current operating state of the engine or for realizing a scheduled predetermined operating state. In this case, the torque that is calculated by the arithmetic unit 124 is referred to as "other first torque". In the drawings, the other first torque is described as "TQ1etc". The other first torque includes torque within a range of variation that can be achieved by only control of the air amount, out of torques necessary for keeping a predetermined idling engine speed in a case where the engine is in an idling state. The arithmetic unit 124 outputs a valid value only in a case where such a torque is actually required, and calculates an invalid value during a period in which such a torque is not required. The invalid value is set to a value that is larger than the maximum shaft torque that the engine can output.

The arithmetic unit 126 calculates, as a control parameter for the engine, a torque that is classified as a second torque among torques that are necessary for maintaining the current operating state of the engine or for realizing a scheduled predetermined operating state. In this case, the torque that is calculated by the arithmetic unit 126 is referred to as "other second torque". In the drawings, the other second torque is described as "TQ2etc". The other second torque includes torque requiring control of an ignition timing for achievement of the torque, out of torques that are required to keep a predetermined idling engine speed, in the case where the engine is an idling state. The arithmetic unit 126 outputs a valid value only in a case where such a torque is actually required, and calculates an invalid value during a period in which such a torque is not required. The invalid value is set to a value that is larger than the maximum shaft torque that the engine can output.

The arithmetic unit 128 calculates, as a control parameter for the engine, an ignition timing efficiency that is necessary for maintaining the current operating state of the engine or for realizing a scheduled predetermined operating state. In this case, the ignition timing efficiency that is calculated by the arithmetic unit 128 is referred to as "other efficiency". In the drawings, the other efficiency is described as "ηetc". An ignition timing efficiency that is necessary for warming up an exhaust purification catalyst when starting the engine is included in the other efficiency. The more the ignition timing efficiency is lowered, the less the amount of energy that is converted to torque will be among the energy generated by the combustion of fuel, and thus an amount of energy that is increased by an amount corresponding to the decrease in the energy converted to torque will be discharged to the exhaust passage together with the exhaust gas and used to warm up the exhaust purification catalyst. Note that, during a period in which it is not necessary to realize such efficiency, the efficiency value outputted from the arithmetic unit 128 is held at a value of 1 that is the maximum value.

The requested first torque, the other first torque, the target air-fuel ratio, the virtual air-fuel ratio, the target efficiency for switching, the other efficiency, the requested second torque, the target second torque for switching, and the other second torque are outputted from the large arithmetic unit 120 configured as described above. These control parameters are input to the large arithmetic unit 140. Note that, although the requested first torque and the requested second torque that are received from the powertrain manager 200 are shaft torques, correction of these torques into indicated torques is performed at the large arithmetic unit 120. Correction of the requested torque to the indicated torque is performed by adding or subtracting a friction torque, an auxiliary driving torque and a pump loss to or from the requested torque. Note that, torques such as the target second torque for switching that are calculated within the large arithmetic unit 120 are each calculated as an indicated torque.

Next, the large arithmetic unit 140 will be described. As described above, various engine control parameters are sent to the large arithmetic unit 140 from the large arithmetic unit 120. Among these, the requested first torque and the other first torque are requests with respect to control amounts that belong to the same category, and these cannot be realized simultaneously. Likewise, the requested second torque, the other second torque and the target second torque for switching are requests with respect to control amounts that belong to the same category, and these cannot be realized simultaneously. Likewise, the target efficiency for switching and the other efficiency are requests with respect to control amounts that belong to the same category, and these cannot be realized simultaneously. Consequently, processing is necessary that performs a mediation process for each control amount category. As used herein, the term "mediation" refers to a computation process for obtaining a single numerical value from a plurality of numerical values, such as, for example, selecting a maximum value, selecting a minimum value, averaging, or superimposing, and a configuration can also be adopted in which the mediation process appropriately combines a plurality of kinds of computation processes. To execute such kind of mediation for each control amount category, the large arithmetic unit 140 includes three arithmetic units 142, 144, and 146.

The arithmetic unit 142 is configured to perform a mediation process with respect to the first torque. The requested first torque and the other first torque are inputted to the arithmetic unit 142. The arithmetic unit 142 performs a mediation process on these values, and outputs a torque that is obtained as the mediation result as a target first torque that is finally determined. In FIG. 1, the finally determined target first torque is described as "TQ1t". Minimum value selection is used as the mediation method in the arithmetic unit 142. Accordingly, in a case where a valid value is not output from the arithmetic unit 124, the requested first torque that is provided from the powertrain manager 200 is calculated as the target first torque.

The arithmetic unit 144 is configured to perform a mediation process with respect to the ignition timing efficiency. The target efficiency for switching and the other efficiency are inputted to the arithmetic unit 144. The arithmetic unit 144 performs a mediation process on these values, and outputs an efficiency that is obtained as the mediation result as a target efficiency that is finally determined. In FIG. 1, the finally determined target efficiency is described as "ηt". Minimum value selection is used as the mediation method in the arithmetic unit 144. From the viewpoint of fuel consumption performance, it is preferable that the ignition timing efficiency is 1 which is the maximum value thereof. Therefore, as long as no special event occurs, the target efficiency for switching that is calculated by the arithmetic unit 122 and the other efficiency that is calculated by the arithmetic unit 128 are each maintained at a value of 1 that is the maximum value. Accordingly, the value of the target efficiency that is output from the arithmetic unit 144 is fundamentally 1, and a value that is less than 1 is only selected in a case where an event of some kind has occurred.

The arithmetic unit 146 is configured to perform a mediation process with respect to the second torque. The requested second torque, the other second torque, and the target second torque for switching are inputted to the arithmetic unit 146. The arithmetic unit 146 performs a mediation process on these values, and outputs a torque that is obtained as the mediation result as a target second torque that is finally determined. In FIG. 1, the finally determined target second torque is described as "TQ2t". Minimum value selection is used as the mediation method in the arithmetic unit 146. The second torque, including the target second torque for switching, is fundamentally an invalid value, and is switched to a valid value showing the size of the torque it is desired to realize only in a case where a specific event has occurred. Accordingly, the target second torque that is output from the arithmetic unit 146 is also fundamentally an invalid value, and a valid value is selected in only a case where an event of some kind has occurred.

The target first torque, the target efficiency, the virtual air-fuel ratio, the target air-fuel ratio, and the target second torque are output from the large arithmetic unit 140 that is configured as described above. These control parameters are input to the large arithmetic unit 160.

The large arithmetic unit 160 corresponds to an inverse model of the engine, and is constituted by a plurality of models that are represented by a map or a function. Operation amounts of the respective actuators 2, 4, 6, 8, and 12 for coordinated operations are calculated by the large arithmetic unit 160. Among the control parameters that are inputted from the large arithmetic unit 140, the target first torque and the target second torque are each handled as target values of the torque with respect to the engine. However, the target second torque takes priority over the target first torque. In the large arithmetic unit 160, calculation of operation amounts of the respective actuators 2, 4, 6, 8, and 12 is performed so as to achieve the target second torque in a case where the target second torque is a valid value, or so as to achieve the target first torque in a case where the target second torque is an invalid value. Calculation of the operation amounts is performed so as to also achieve the target air-fuel ratio, the target efficiency, and the target EGR rate simultaneously with the target torque. That is, according to the controlling device of the present embodiment, the torque, the efficiency, the air-fuel ratio, and the EGR rate are used as control amounts of the engine, and air amount control, ignition timing control, fuel injection amount control, and EGR control are conducted based on the target values of these four kinds of control amounts.

The large arithmetic unit 160 includes a plurality of arithmetic units 162, 164, 166, 168, 170, 172, 174, 176, 178, 192, and 194. Among these arithmetic units, the arithmetic units 162, 164, 166, and 178 relate to air amount control, the arithmetic units 168, 170, and 172 relate to ignition timing control, the arithmetic units 174 and 176 relate to fuel injection amount control, and the arithmetic units 192 and 194 relate to EGR control. Hereunder, the functions of the respective arithmetic units are described in detail in order, starting from the arithmetic units relating to air amount control.

The target first torque, the target efficiency and the virtual air-fuel ratio are inputted to the arithmetic unit 162. The arithmetic unit 162 corresponds to target air amount calculation means of the present invention, and uses the target efficiency and the virtual air-fuel ratio to back-calculate a target air amount for achieving the target first torque from the target first torque. In this calculation, the target efficiency and the virtual air-fuel ratio are used as parameters that provide a conversion efficiency of the air amount to torque. Note that, in the present invention, the term "air amount" refers to the amount of air that is drawn into the cylinders, and a charging efficiency or a load factor, which are non-dimensional equivalents of the air amount, are within an equal range to the air amount in the present invention.

The arithmetic unit 162 first calculates a target torque for air amount control by dividing the target first torque by the target efficiency. If the target efficiency is less than 1, the target torque for air amount control becomes larger than the target first torque. This means that a requirement with respect to the air amount control by the actuators 2 and 8 is to enable the potential output of torque that is greater than the target first torque. On the other hand, if the target efficiency is 1, the target first torque is calculated as it is as the target torque for air amount control.

Next, the arithmetic unit 162 converts the target torque for air amount control to a target air amount using a torque-air amount conversion map. The torque-air amount conversion map is prepared on the premise that the ignition timing is the optimal ignition timing, and is a map in which the torque and the air amount are associated using various engine status amounts, such as engine speed and the air-fuel ratio as keys. This map is created based on data obtained by testing the engine. Actual values or target values of the engine status amounts are used to search the torque-air amount conversion map. With regard to the air-fuel ratio, the virtual air-fuel ratio is used to search the map. Accordingly, at the arithmetic unit 162, the air amount that is required to realize the target torque for air amount control under the virtual air-fuel ratio is calculated as the target air amount. In the drawings, the target air amount is described as "KLt".

The arithmetic unit 164 back-calculates a target intake pipe pressure that is a target value of the intake pipe pressure from the target air amount. A map that describes the relation between an air amount that is drawn into the cylinders through the intake valve and the intake pipe pressure is used to calculate the target intake pipe pressure. The relation between the air amount and the intake pipe pressure changes depending on the valve timing. Therefore, when calculating the target intake pipe pressure, a parameter value of the aforementioned map is determined based on the current valve timing. The target intake pipe pressure is described as "Pmt" in the drawings.

The arithmetic unit 166 calculates a target degree of throttle opening that is a target value of the degree of throttle opening based on the target intake pipe pressure. An inverse model of the air model is used to calculate the target degree of throttle opening. The air model is a physical model which is obtained as the result of modeling the response characteristic of the intake pipe pressure with respect to operation of the throttle 2. Therefore, the target degree of throttle opening that is required to achieve the target intake pipe pressure can be back-calculated from the target intake pipe pressure using the inverse model thereof. The target degree of throttle opening is described as "TA" in the drawings. The target degree of throttle opening calculated by the arithmetic unit 166 is converted to a signal for driving the throttle 2, and is sent to the throttle 2 through an interface 111 of the ECU. The arithmetic units 164 and 166 correspond to first actuator control means according to the present invention.

The arithmetic unit 178 calculates a target valve timing that is a target value of the valve timing based on the target air amount. A map in which the air amount and the valve timing are associated using engine speed as an argument is utilized to calculate the target valve timing. The target valve timing is the optimal displacement angle of the VVT 8 for achieving the target air amount based on the current engine speed, and the specific value thereof is determined by adaptation for each air amount and each engine speed. However, at a time of acceleration when the target air amount increases to a large degree at a high speed, the target valve timing is corrected to an advance side from the valve timing which is determined from the map in order to increase the actual air amount at a maximum speed to cause the actual air amount to follow the target air amount. The target valve timing is described as "VT" in the drawings. The target valve timing calculated by the arithmetic unit 178 is converted to a signal for driving the VVT 8, and is sent to the VVT 8 through an interface 112 of the ECU. The arithmetic unit 178 also corresponds to first actuator control means in the present invention.

Next, the functions of the arithmetic units relating to ignition timing control will be described. The arithmetic unit 168 calculates an estimated torque based on the actual degree of throttle opening and the valve timing realized by the above described air amount control. The term "estimated torque" as used in the present description refers to torque that can be output in a case where the ignition timing is set to the optimal ignition timing based on the current degree of throttle opening and valve timing and the target air-fuel ratio. The arithmetic unit 168 first calculates an estimated air amount based on a measured value of the degree of throttle opening and a measured value of the valve timing using a forward model of the aforementioned air model. The estimated air amount is an estimated value of an air amount that is actually realized by the current degree of throttle opening and valve timing. Next, the arithmetic unit 168 converts the estimated air amount to an estimated torque using the torque-air amount conversion map. The target air-fuel ratio is used as a search key when searching the torque-air amount conversion map. The estimated torque is described as "TQe" in the drawings.

The target second torque and the estimated torque are inputted to the arithmetic unit 170. The arithmetic unit 170 calculates an indicated ignition timing efficiency that is an indicated value of the ignition timing efficiency based on the target second torque and the estimated torque. The indicated ignition timing efficiency is expressed as a proportion of the target second torque to the estimated torque. However, an upper limit is defined for the indicated ignition timing efficiency, and the value of the indicated ignition timing efficiency is set as 1 in a case where the proportion of the target second torque with respect to the estimated torque exceeds 1. The indicated ignition timing efficiency is described as "ηi" in the drawings.

The arithmetic unit 172 calculates the ignition timing based on the indicated ignition timing efficiency. More specifically, the arithmetic unit 172 calculates the optimal ignition timing based on engine status amounts such as engine speed, the requested torque and the air-fuel ratio, and calculates a retardation amount with respect to the optimal ignition timing based on the indicated ignition timing efficiency. When the indicated ignition timing efficiency is 1, the retardation amount is set as zero, and the retardation amount is progressively increased as the indicated ignition timing efficiency decreases from 1. The arithmetic unit 172 then calculates the result of addition of the retardation amount to the optimal ignition timing as a final ignition timing. A map in which the optimal ignition timing and various engine status amounts are associated can be used to calculate the optimal ignition timing. A map in which the retardation amount, the ignition timing efficiency and various engine status amounts are associated can be used to calculate the retardation amount. The target air-fuel ratio is used as a search key to search these maps. The ignition timing is described as "SA" in the drawings. The ignition timing calculated by the arithmetic unit 172 is converted to a signal for driving the ignition device 6, and is sent to the ignition device 6 through an interface 113 of the ECU. The arithmetic units 168, 170 and 172 correspond to third actuator control means in the present invention.

Next, functions of the arithmetic units relating to fuel injection amount control will be described. The arithmetic unit 174 calculates an estimated air amount based on a measured value of the degree of throttle opening and a measured value of the valve timing using the forward model of the air model described above. The estimated air amount calculated by the arithmetic unit 174 is preferably an air amount that is predicted to arise at a timing at which the intake valve closes. An air amount that will arise in the future can be predicted, for example, based on the target degree of throttle opening by setting a delay time period from calculation of the target degree of throttle opening until the output thereof. The estimated air amount is described as "KLe" in the drawings.

The arithmetic unit 174 calculates a fuel injection amount, that is, a fuel supply amount, that is required to achieve the target air-fuel ratio based on the target air-fuel ratio and the estimated air amount. Calculation of the fuel injection amount is executed when the timing for calculating a fuel injection amount arrives with respect to each cylinder. The fuel injection amount is described as "TAU" in the drawings. The fuel injection amount calculated by the arithmetic unit 174 is converted to a signal for driving the injector 4, and is sent to the injector 4 through an interface 114 of the ECU. The arithmetic units 174 and 176 correspond to second actuator control means in the present invention.

Next, functions of arithmetic units relating to EGR control will be described. A virtual air-fuel ratio is inputted to an arithmetic unit 192. The arithmetic unit 192 corresponds to target EGR rate calculation means in the present invention, and calculates a target EGR rate for optimizing exhaust emission, fuel consumption and the like by using the virtual air-fuel ratio. Note that in the present invention, the EGR rate refers to a ratio of an EGR gas in the air that is taken into the cylinder from the intake valve, and an EGR amount representing the amount of the EGR gas which is taken into the cylinder from the intake valve is within a range of equality to the EGR rate in the present invention.

The arithmetic unit 192 calculates the target EGR rate by using an EGR rate map. The EGR rate map refers to a map in which the EGR rate is related with engine state quantities including engine speed, the air amount and the air-fuel ratio as keys. The map is determined by adaptation of each of the air amount, engine speed and the air-fuel ratio. For search of the EGR rate map, actual values and target values of the engine state quantities are used. Regarding the air-fuel ratio, the virtual air-fuel ratio is used in the map search. Accordingly, in the arithmetic unit 192, the EGR rate which is required under the virtual air-fuel ratio is calculated as the target EGR rate. In the drawings, the target EGR rate is described as "EGRt".

An arithmetic unit 194 calculates a target degree of EGR valve opening that is a target value of a degree of EGR valve opening based on the target EGR rate. In the calculation of the target degree of EGR valve opening, a mathematical expression and a map modeling response of the EGR rate to an action of the EGR valve based on the hydrodynamics and the like can be used. Since the EGR rate is influenced by engine speed and the air amount, engine speed and the air amount are used as parameters in the calculation of the target degree of EGR valve opening. In the drawings, the target degree of EGR valve opening is described as "EGRv". The target degree of EGR valve opening that is calculated in the arithmetic unit 194 is converted to a signal for driving an EGR valve 12 and is sent to the EGR valve 12 through an interface 116 of the ECU. The arithmetic unit 194 corresponds to fourth actuator control means in the present invention. As an operation amount of the EGR valve 12, a duty ratio of a solenoid that drives the EGR valve may be adopted, instead of the degree of EGR valve opening.

The foregoing is an overview of the logic of the ECU according to the present embodiment. Next, the arithmetic unit 122 that is a main portion of the ECU according to the present embodiment will be described in detail.

Figure 2:
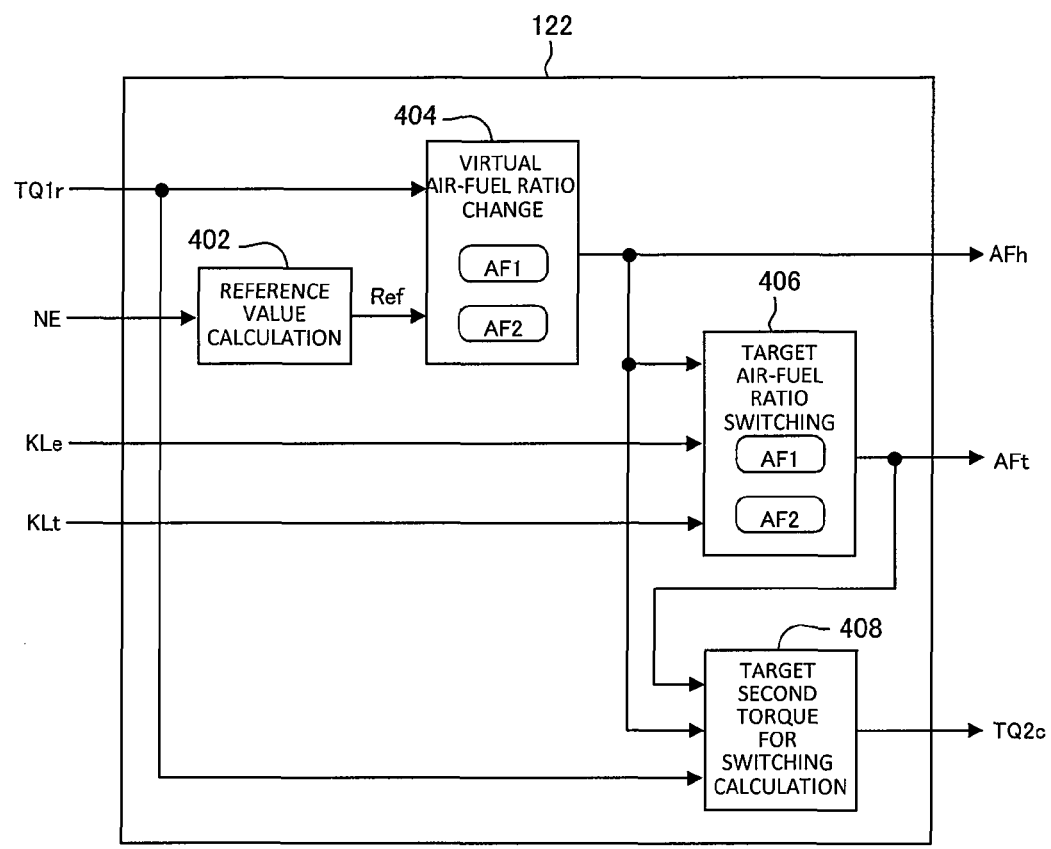
FIG. 2 is a block diagram illustrating a logic of switching of an operation mode of the controlling device according to the first embodiment of the present invention.

The logic of the arithmetic unit 122 is illustrated by means of a block diagram in FIG. 2. Inside the block illustrating the arithmetic unit 122 in FIG. 2, among the various functions that the arithmetic unit 122 is equipped with, functions relating to switching of the operation mode are represented by blocks. An arithmetic unit is allocated to each of these blocks. A program corresponding to each block is prepared in the ECU, and the functions of the respective arithmetic units are realized in the ECU by executing the programs using a processor. Note that in the case where the ECU includes a multi-core processor, arithmetic units 402, 404, 406 and 408 that configure the arithmetic unit 122 can be distributed and assigned to a plurality of cores.

First, an arithmetic unit 402 will be described. The arithmetic unit 402 calculates a reference value for the torque. The reference value is a torque that serves as a boundary between a lean mode and a stoichiometric mode, and the optimal value is adapted for each engine speed from the viewpoint of fuel consumption performance, exhaust gas performance and drivability. The arithmetic unit 402 refers to a previously prepared map to calculate a reference value that is suitable for engine speed. The reference value is described as "Ref" in the drawings.

Next, the arithmetic unit 404 will be described. The requested first torque is inputted to the arithmetic unit 404. In addition, the reference value calculated by the arithmetic unit 402 is set with respect to the arithmetic unit 404. The arithmetic unit 404 changes a value of the virtual air-fuel ratio that is used to calculate the target air amount, based on the relation between the requested first torque and the reference value that are inputted. More specifically, the arithmetic unit 404 switches the virtual air-fuel ratio from a first air-fuel ratio to a second air-fuel ratio or from the second air-fuel ratio to the first air-fuel ratio. The first air-fuel ratio is the theoretical air-fuel ratio (for example, 14.5). The first air-fuel ratio is described as "AF1" in the drawings. The second air-fuel ratio is a leaner air-fuel ratio than the first air-fuel ratio, and is set to a certain fixed value (for example, 22.0). The second air-fuel ratio is described as "AF2" in the drawings. The arithmetic unit 404 corresponds to virtual air-fuel ratio changing means in the present invention.

During a period in which the requested first torque is greater than the reference value, the arithmetic unit 404 sets the virtual air-fuel ratio to the first air-fuel ratio in response to the requested first torque being greater than the reference value. If the requested first torque decreases in accordance with a deceleration request of the driver and in due course becomes less than the reference value, the arithmetic unit 404 switches the virtual air-fuel ratio from the first air-fuel ratio to the second air-fuel ratio in response to the requested first torque decreasing to a value that is less than or equal to the reference value. Meanwhile, during a period in which the requested first torque is smaller than the reference value, the arithmetic unit 404 sets the virtual air-fuel ratio at the second air-fuel ratio in response to the requested first torque being smaller than the reference value. When the requested first torque increases in accordance with an acceleration request of the driver, and in due course the requested first torque becomes larger than the reference value, the arithmetic unit 404 switches the virtual air-fuel ratio to the first air-fuel ratio from the second air-fuel ratio in response to the requested first torque increasing to the reference value or larger.

Next, the arithmetic unit 406 will be described. The arithmetic unit 406 corresponds to target air-fuel ratio switching means of the present invention. The first air-fuel ratio that is used in the stoichiometric mode and the second air-fuel ratio that is used in the lean mode are previously set as default values of the target air-fuel ratio in the arithmetic unit 406. The virtual air-fuel ratio determined by the arithmetic unit 404, a value of the target air amount calculated in a previous step by the arithmetic unit 162, and a value of the estimated air amount calculated in a previous step by the arithmetic unit 174 are inputted to the arithmetic unit 406.

First, switching of the target air-fuel ratio under a situation where the requested first torque is decreasing in accordance with a deceleration request of the driver will be described. Upon detecting that the virtual air-fuel ratio that is inputted from the arithmetic unit 404 is switched from the first air-fuel ratio to the second air-fuel ratio, the arithmetic unit 406 calculates a difference between the target air amount and the estimated air amount. Subsequently, when the estimated air amount sufficiently approaches the estimated air amount, more specifically, when the difference between the target air amount and the estimated air amount becomes equal to or smaller than a predetermined threshold value, the arithmetic unit 406 switches the target air-fuel ratio from the first air-fuel ratio to the second air-fuel ratio. That is to say, at the time of deceleration when the requested first torque decreases, switching of the target air-fuel ratio from the first air-fuel ratio to the second air-fuel ratio is performed, after switching of the virtual air-fuel ratio from the first air-fuel ratio to the second air-fuel ratio. By switching of the target air-fuel ratio, the operation mode is switched from the stoichiometric mode to the lean mode.

Switching of the target air-fuel ratio under a situation where the requested first torque is increasing in accordance with the acceleration request of the driver will be described. Upon detecting that the virtual air-fuel ratio that is inputted from the arithmetic unit 404 is switched from the second air-fuel ratio to the first air-fuel ratio, the arithmetic unit 406 switches the target air-fuel ratio from the second air-fuel ratio to the first air-fuel ratio in response thereto. That is to say, at the time of acceleration when the requested first torque increases, switching of the target air-fuel ratio from the second air-fuel ratio to the first air-fuel ratio is performed, simultaneously with switching of the virtual air-fuel ratio from the second air-fuel ratio to the first air-fuel ratio. By switching of the target air-fuel ratio, the operation mode is switched from the lean mode to the stoichiometric mode.

Finally the arithmetic unit 408 will be described. The arithmetic unit 408 calculates the target second torque for switching. As described above, the target second torque for switching is inputted to the arithmetic unit 146 together with the requested second torque and the other second torque, and the smallest value among those values is selected by the arithmetic unit 146. The requested second torque and the other second torque are normally invalid values, and are switched to valid values only in a case where a special event has occurred. The same applies to the target second torque for switching also, and the arithmetic unit 430 normally sets the output value of the target second torque for switching to an invalid value.

The requested first torque, the target air-fuel ratio, and the virtual air-fuel ratio are inputted to the arithmetic unit 408. According to the logic of the arithmetic units 404 and 408, the target air-fuel ratio and the virtual air-fuel ratio match before switching the operation mode, and also match after the switching processing is completed. However, during the processing to switch the operation mode, a gap arises between the target air-fuel ratio and the virtual air-fuel ratio. The arithmetic unit 408 calculates the target second torque for switching that has a valid value, only during a period in which a gap arises between the target air-fuel ratio and the virtual air-fuel ratio. In this case, the requested first torque is used as the valid value of the target second torque for switching. That is, during a period in which a gap arises between the target air-fuel ratio and the virtual air-fuel ratio, the requested first torque is output from the arithmetic unit 408 as the target second torque for switching.

The foregoing is a detailed description of the logic of the arithmetic unit 122, that is, the logic for switching the operation mode that is adopted in the present embodiment. Next, control results in a case where engine control is executed in accordance with the above described logic will be described based on a time chart illustrating an image thereof.

Figure 3:
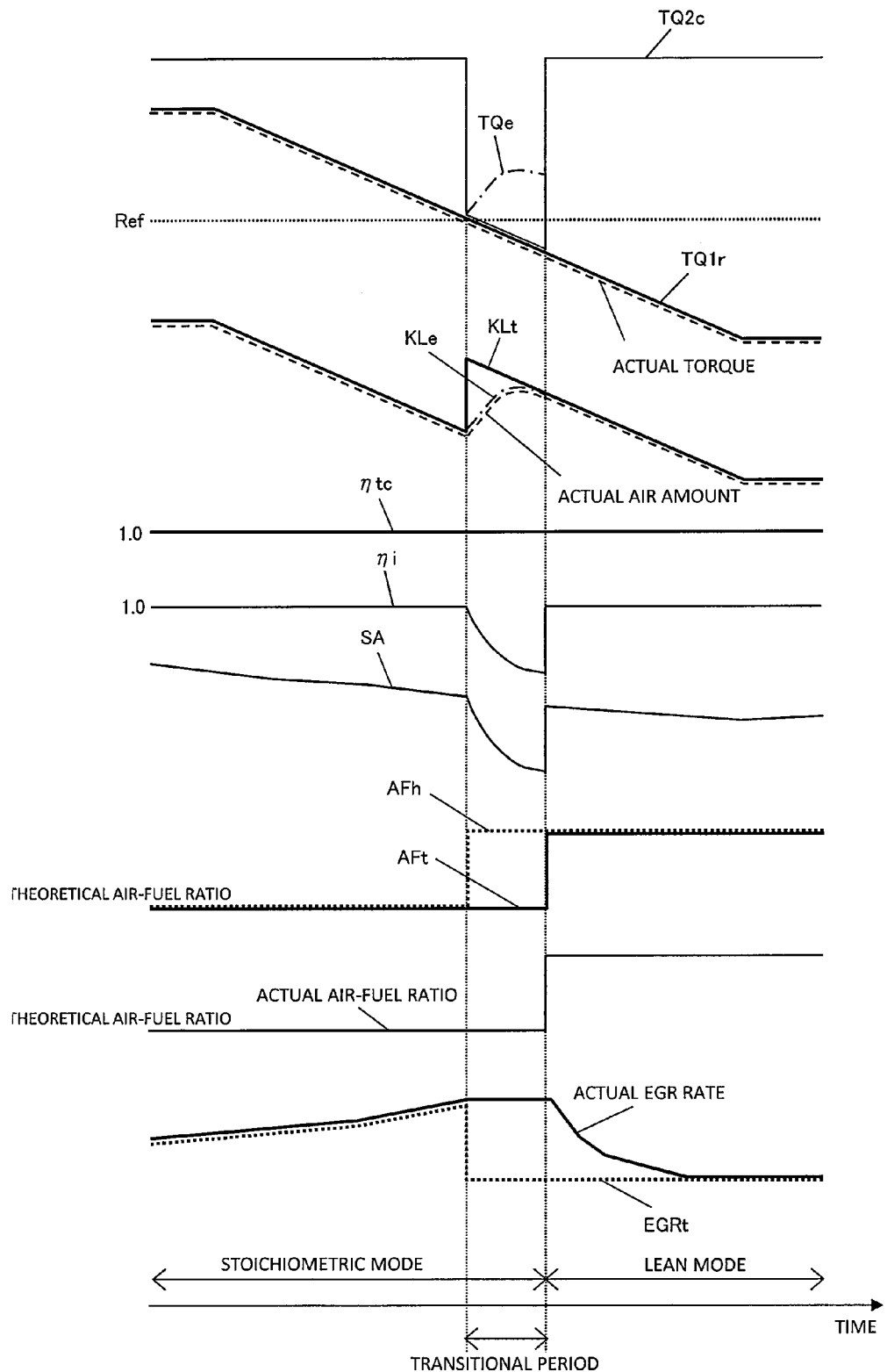
FIG. 3 is a time chart illustrating an image of a control result at a time of deceleration by the controlling device according to the first embodiment of the present invention.

FIG. 3 is a time chart that illustrates an image of results of control at a time of deceleration performed by the ECU according to the present embodiment. In FIG. 3, a chart on a first tier illustrates changes over time in the torque. As described above, "TQ1r" denotes the requested first torque, "TQ2c" denotes the target second torque for switching, and "TQe" denotes the estimated torque. Note that, in this case it is assumed that the requested first torque is the final target first torque, and the target second torque for switching is the final target second torque. Further, in addition to these torques, the actual torque is represented by a dashed line on the chart. However, the actual torque is not measured by the actual engine control. The line for the actual torque that is shown in the chart is an image line that is supported by test results.

A chart on a second tier in FIG. 3 illustrates changes over time in the air amount. As described above, "KLt" denotes the target air amount, "KLe" denotes the estimated air amount. In addition to these air amounts, the actual air amount is also represented by a dashed line in the chart. However, the actual air amount is not measured by the actual engine control. The line for the actual air amount that is shown in the chart is an image line that is supported by test results.

A chart on a third tier in FIG. 3 illustrates changes over time in a target efficiency for switching. As described above, "ηtc" denotes the target efficiency for switching. Note that in this case, the target efficiency for switching is a final target efficiency.

A chart on a fourth tier in FIG. 3 illustrates changes over time in the indicated ignition timing efficiency. As described above, "ηi" denotes the indicated ignition timing efficiency.

A chart on a fifth tier in FIG. 3 illustrates changes over time in the ignition timing. As described above, "SA" denotes the ignition timing.

A chart on a sixth tier in FIG. 3 illustrates changes over time in the air-fuel ratio. As described above, "AFt" denotes the target air-fuel ratio, and "AFh" denotes the virtual air-fuel ratio. In addition, a chart on a seventh tier in FIG. 3 illustrates changes over time in the actual air-fuel ratio.

A chart on an eighth tier in FIG. 3 illustrates changes over time in the EGR rate. As described above, "EGRt" denotes the target EGR rate. In the chart, the actual EGR rate is expressed by a solid line with the target EGR rate. However, the actual EGR rate is not measured in actual engine control. The line representing the actual EGR rate plotted in the chart is an image line supported by a test result.

Results of control at a time of deceleration will now be described based on FIG. 3. At a time of deceleration, the target air-fuel ratio and the virtual air-fuel ratio are each maintained at the first air-fuel ratio that is the theoretical air-fuel ratio until the requested first torque decreases to the level of the reference value that is represented by "Ref" in FIG. 6. Hence, the target air amount that is calculated based on the requested first torque and the virtual air-fuel ratio decrease in response to a decrease in the requested first torque. During this period, the target second torque for switching is set to an invalid value in response to the target air-fuel ratio and the virtual air-fuel ratio matching. Since the indicated ignition timing efficiency becomes 1 when the target second torque for switching is an invalid value, the ignition timing is maintained at the optimal ignition timing. Note that, although the ignition timing in the chart changes in accordance with a decrease in the requested first torque, this is a change that corresponds to the optimal ignition timing changing depending on engine speed or the air amount.

Further, since the target EGR rate is calculated by using the virtual air-fuel ratio, the target EGR rate in the above period is calculated from the first air-fuel ratio which is the theoretical air-fuel ratio. Note that in the chart, the target EGR rate changes although the virtual air-fuel ratio is kept at the first air-fuel ratio, and this is a change corresponding to the target EGR rate changing in accordance with engine speed and the air amount.

When the requested first torque becomes lower than the reference value, only the virtual air-fuel ratio is switched from the first air-fuel ratio to the second air-fuel ratio. That is, although the target air-fuel ratio is maintained at the theoretical air-fuel ratio, the virtual air-fuel ratio is made leaner in a step manner. Operation according to the second air-fuel ratio that is a lean air-fuel ratio requires a larger air amount than the air amount required for operation according to the first air-fuel ratio that is the theoretical air-fuel ratio. Therefore, when the virtual air-fuel ratio that is used for calculating the target air amount is switched in a step manner to the second air-fuel ratio, the target air amount also increases in a step manner at the time point of such switching. However, because there is a response delay until the actuator operates and the air amount changes, the actual air amount and the estimated air amount that is an estimated value thereof do not increase in a step manner, and increase at a delayed time relative to the target air amount. The actual air amount and the estimated air amount gradually converge to the target air amount, and in due course, the difference between the target air amount and the estimated air amount becomes equal to or smaller than a threshold value. At this point of time, the target air-fuel ratio is switched from the first air-fuel ratio to the second air-fuel ratio.

Further, when the requested first torque becomes lower than the reference value, the virtual air-fuel ratio that is used in the calculation of the target EGR rate is switched to the second air-fuel ratio in a step manner, and thereby at the point of time of the switch, the target EGR rate also decreases in a step manner. However, since there is a delay in response until the EGR rate changes after the actuator is operated, the actual EGR rate does not decrease in a step manner, but decreases behind the target EGR rate. The actual EGR rate gradually converges to the target EGR rate, and in due course, follows the target EGR rate.

During a period until the target air-fuel ratio and the virtual air-fuel ratio coincide with each other again after the requested first torque becomes lower than the reference value and the target air-fuel ratio and the virtual air-fuel ratio deviate from each other, the target second torque for switching is set at the same value as the requested first torque which is a valid value. Meanwhile, the estimated torque predicated on the virtual air-fuel ratio becomes a value larger than the requested first torque predicated on the target air-fuel ratio as the virtual air-fuel ratio that is used in calculation of the target air amount is made leaner than the target air-fuel ratio. As the result, the indicated ignition timing efficiency which is the proportion of the target second torque for switching relative to the estimated torque becomes a value smaller than one. Subsequently, in response to the indicated ignition timing efficiency becoming smaller than one, the ignition timing is retarded from the optimal ignition timing. As the result, increase in the torque by the excessive air amount is cancelled out by decrease in the torque by retardation of the ignition timing, and the deviation of the actual torque from the requested first torque is prevented.

Further, during the period until the target air-fuel ratio and the virtual air-fuel ratio coincide with each other again after the requested first torque becomes lower than the reference value and the target air-fuel ratio and the virtual air-fuel ratio deviate from each other, the target EGR rate is calculated by using the second air-fuel ratio. As the result, the target EGR rate is made an EGR rate corresponding to the second air-fuel ratio prior to the target air-fuel ratio being switched from the first air-fuel ratio to the second air-fuel ratio, and therefore, the delay in response of the EGR rate at the time of switching the target air-fuel ratio is effectively reduced.

As above, according to the logic which is adopted in the present embodiment, the air-fuel ratio can be switched from the first air-fuel ratio which is the theoretical air-fuel ratio to the second air-fuel ratio which is the air-fuel ratio leaner than the theoretical air-fuel ratio with a high responsiveness while smooth decrease of torque corresponding to the deceleration request of the driver is achieved. Further, according to the logic which is adopted in the present embodiment, the EGR rate in the case of switching the air-fuel ratio from the first air-fuel ratio which is the theoretical air-fuel ratio to the second air-fuel ratio which is the air-fuel ratio leaner than the theoretical air-fuel ratio can be controlled with a high responsiveness.

Second Embodiment

Next, a second embodiment of the present invention will be described with reference to the drawings.

Figure 4:
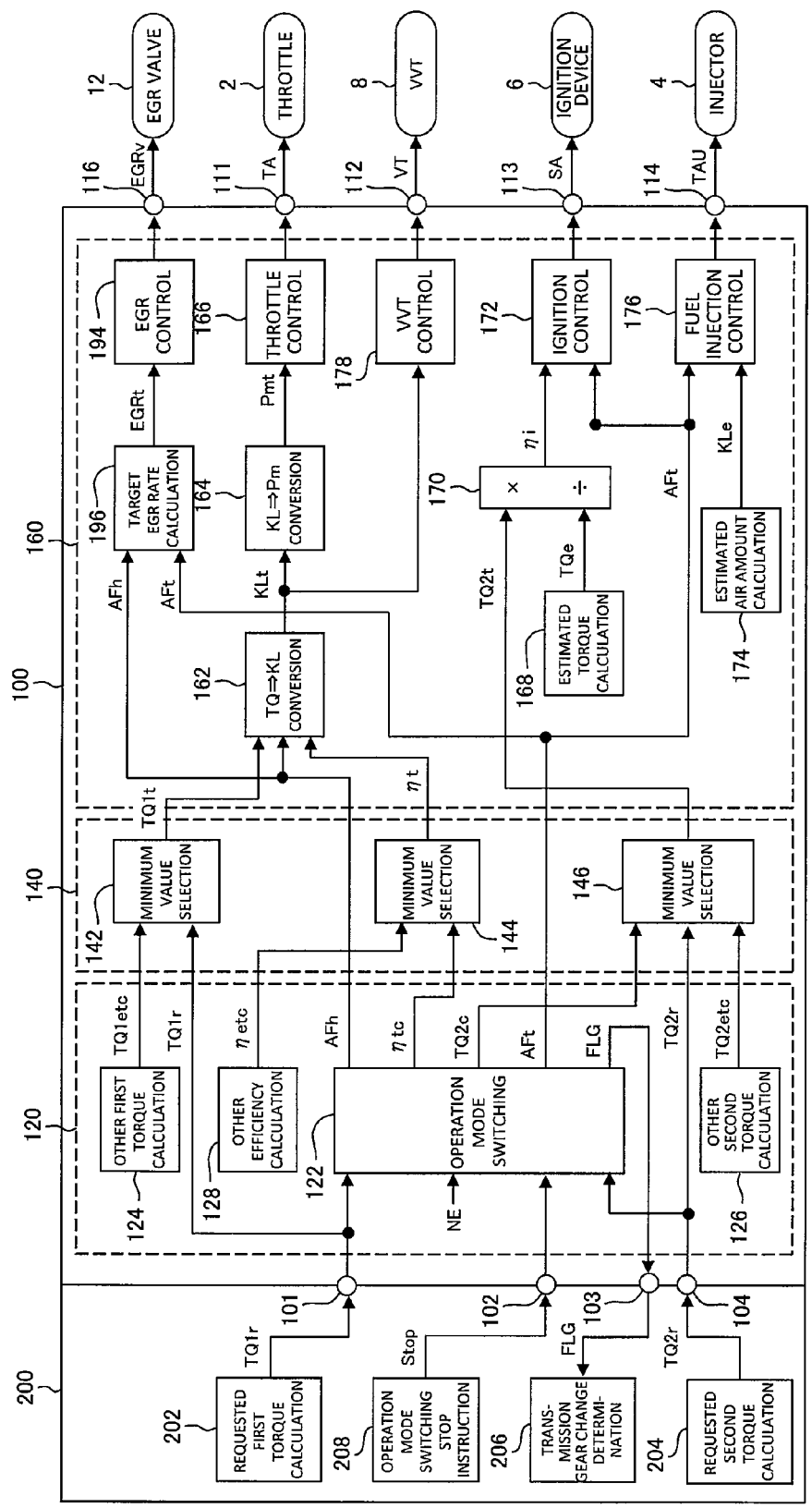
FIG. 4 is a block diagram illustrating a logic of a controlling device according to a second embodiment of the present invention.

The second embodiment and the first embodiment differ in the logic of the calculation units relating to the EGR control. FIG. 4 illustrates a logic of the ECU according to the present embodiment in a block diagram. The ECU includes the engine controller 100 and the powertrain manager 200. In the block representing the powertrain manager 200, various functions with which the powertrain manager 200 is equipped are expressed by blocks. Among them, the blocks representing the common functions to the functions of the ECU according to the first embodiment are assigned with the common reference signs. Further, in the block representing the engine controller 100, functions relating to coordinated operations of the actuators, among various functions with which the engine controller 100 is equipped, are expressed by blocks. Among them, the blocks representing the common functions to the functions of the ECU according to the first embodiment are assigned with the common reference signs. Hereunder, the difference from the first embodiment, that is, a block representing the function of an arithmetic unit 196 relating to the EGR control will be mainly described.

In addition to the virtual air-fuel ratio, the target air-fuel ratio is inputted to the arithmetic unit 196. The arithmetic unit 196 corresponds to the target EGR rate calculation means in the present invention, and calculates the target EGR rate for optimizing the exhaust emission, fuel consumption and the like by using the virtual air-fuel ratio and the target air-fuel ratio.

Figure 5:
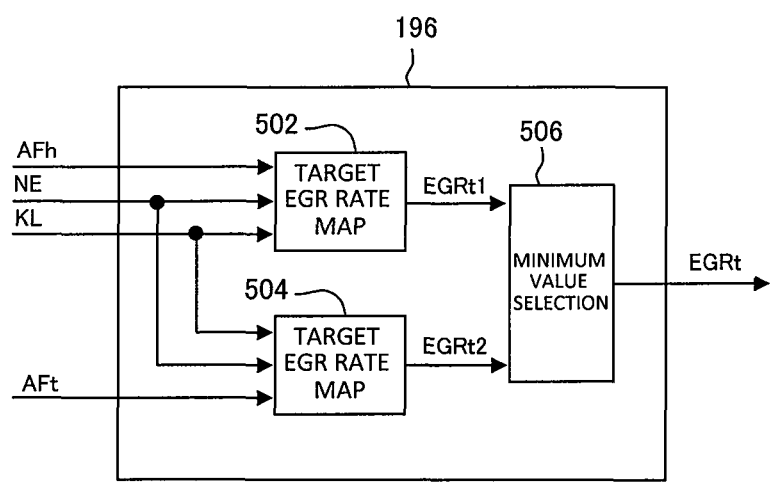
FIG. 5 is a block diagram illustrating a logic of calculation of a target EGR rate of the controlling device according to the second embodiment of the present invention.

In FIG. 5, a logic of the arithmetic unit 196 is illustrated in a block diagram. In the block representing the arithmetic unit 196 in FIG. 5, functions relating to calculation of the target EGR rate, among various functions with which the arithmetic unit 196 is equipped, are expressed by blocks. Arithmetic units are assigned to the respective blocks. In the ECU, programs corresponding to the respective blocks are prepared, and the programs are executed by a processor, whereby the functions of the respective arithmetic units are realized in the ECU. In the case where the ECU includes a multi-core processor, arithmetic units 502, 504 and 506 that configure the arithmetic unit 196 are distributed and assigned to a plurality of cores.

The arithmetic unit 502 calculates the target EGR rate by using the EGR rate map. The EGR rate map refers to the map in which the EGR rate is related with the engine state quantities including engine speed, the air amount and the air-fuel ratio as keys. The map is determined by adaptation of each of the air amount, engine speed and the air-fuel ratio. For search of the EGR rate map, the actual values and the target values of the engine state quantities are used. Regarding the air-fuel ratio, the virtual air-fuel ratio is used for map search. Accordingly, in the arithmetic unit 502, the EGR rate which is required to realize the target EGR rate for EGR control under the virtual air-fuel ratio is calculated as a first target value. In the drawings, the first target value of the target EGR rate is described as "EGRt1". Note that the arithmetic unit 502 corresponds to first target value calculation means in the present invention.

The arithmetic unit 504 also calculates the target EGR rate by using the EGR rate map. However, concerning the air-fuel ratio, the target air-fuel ratio is used in map search. Accordingly, in the arithmetic unit 504, the EGR rate which is required to realize the target EGR rate for EGR control under the target air-fuel ratio is calculated as a second target value. In the drawings, the second target value of the EGR rate is described as "EGRt2". Note that the arithmetic unit 504 corresponds to second target value calculation means in the present invention.

The arithmetic unit 506 is configured to perform a mediation process with respect to the target EGR rate by minimum value selection. The first target value and the second target value are inputted to the arithmetic unit 506. The arithmetic unit 506 performs a mediation process on these values by minimum value selection, and outputs a torque that is obtained as the mediation result as a target EGR rate that is finally determined. In the drawings, the finally determined target EGR rate is described as "EGRt". The arithmetic unit 506 corresponds to selection means in the present invention.

The above is the details of the logic of the arithmetic unit 196, that is, the logic of the target EGR calculation function which is adopted in the present embodiment. Next, a control result in a case where engine control is executed in accordance with the aforementioned logic will be described based on a time chart illustrating an image thereof.

Figure 6:
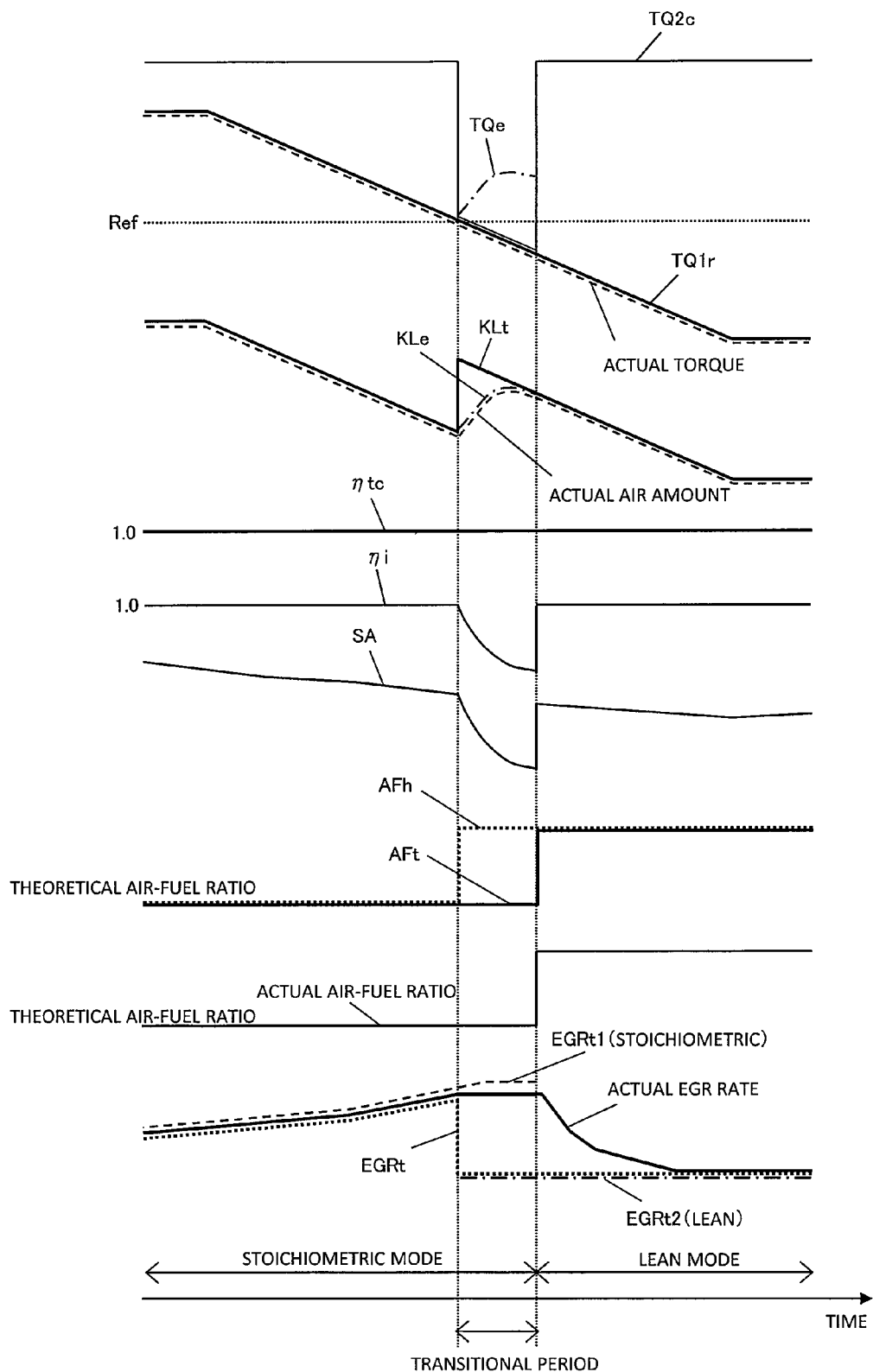
FIG. 6 is a time chart illustrating an image of a control result at a time of deceleration by the controlling device according to the second embodiment of the present invention.

FIG. 6 is a time chart illustrating the image of the control result at the time of deceleration by the ECU according to the present embodiment. The time chart in FIG. 6 is configured by charts on a plurality of tiers, and contents illustrated in the charts are common to the case of the time chart in FIG. 3 except for a change over time of the EGR rate on an eighth tier. A chart on the eighth tier in FIG. 6 illustrates the change over time of the EGR rate. As described above, "EGRt" denotes the target EGR rate, "EGRt1" denotes the first target value of the EGR rate, and "EGRt2" denotes the second target value of the EGR rate. In the charts, the actual EGR rate is expressed by a solid line with these target EGR rates. However, the actual EGR rate is not measured in the actual engine control. The line representing the actual EGR rate plotted in the chart is an image line that is supported by a test result.

At a time of deceleration, the operation up to a time point when the requested first torque reduces to a level of the reference value described as "Ref" does not change from the control result at the time of the first embodiment illustrated in FIG. 3. That is to say, the target air-fuel ratio and the virtual air-fuel ratio during this period are both kept at the first air-fuel ratio which is the theoretical air-fuel ratio. Therefore, the first target value and the second target value of the EGR rate which are calculated during this period become the same value, and this value is used as the target EGR rate.

When the requested first torque becomes lower than the reference value, only the virtual air-fuel ratio is switched from the first air-fuel ratio to the second air-fuel ratio. That is to say, the virtual air-fuel ratio is made lean in a step manner, while the target air-fuel ratio is kept at the theoretical air-fuel ratio. The virtual air-fuel ratio that is used in calculation of the second target value of the EGR rate is switched to the second air-fuel ratio in a step manner, whereby at a point of time of the switch, the second target value also changes in a step manner (decreases in the chart). Meanwhile, since the target air-fuel ratio that is used in calculation of the first target value of the EGR rate is kept at the first air-fuel ratio which is the theoretical air-fuel ratio, the first target value becomes a value different from the second target value without changing in a step manner. Accordingly, in a time period in which the virtual air-fuel ratio and the target air-fuel ratio do not coincide with each other, the target EGR rate is selected by minimum value selection between the first target value and the second target value. In the chart, the second target value is a value smaller than the first target value, and therefore the second target value is used as the target EGR rate. As the result, the target EGR rate is made an EGR rate corresponding to the second air-fuel ratio prior to the target air-fuel ratio being switched from the first air-fuel ratio to the second air-fuel ratio, and therefore, a delay in response in the EGR rate at the time of switching the target air-fuel ratio is effectively reduced.

Note that when the first target value becomes a value smaller than the second target value, the first target value is used as the target EGR rate. As the result, the target EGR rate is kept at the EGR rate corresponding to the first air-fuel ratio until the point of time when the air-fuel ratio is switched to the second air-fuel ratio, without being made the EGR rate corresponding to the second air-fuel ratio prior to the target air-fuel ratio being switched from the first air-fuel ratio to the second air-fuel ratio. Thereby, increase of the EGR rate before switching from the first air-fuel ratio to the second air-fuel ratio can be avoided, and therefore, occurrence of a misfire and an engine stall is effectively avoided.

Third Embodiment

Next, a third embodiment of the present invention will be described with reference to the drawings.

An engine which is taken as a control object in the present embodiment is a spark-ignition type, four-cycle reciprocating engine, and is a turbocharging lean-burn engine including a turbocharger. Actuators that are operated by an ECU that controls an operation of the engine include a wastegate valve (hereunder referred to as a WGV) that is provided in the turbocharger, in addition to a throttle, a VVT, an ignition device, an injector and an EGR valve. The WGV is a turbocharging property variable actuator that changes a turbocharging property of the turbocharger. Since the turbocharging property of the turbocharger changes an air amount, the WGV is included in the first actuator that changes the air amount similarly to the throttle and the VVT.

Figure 7:
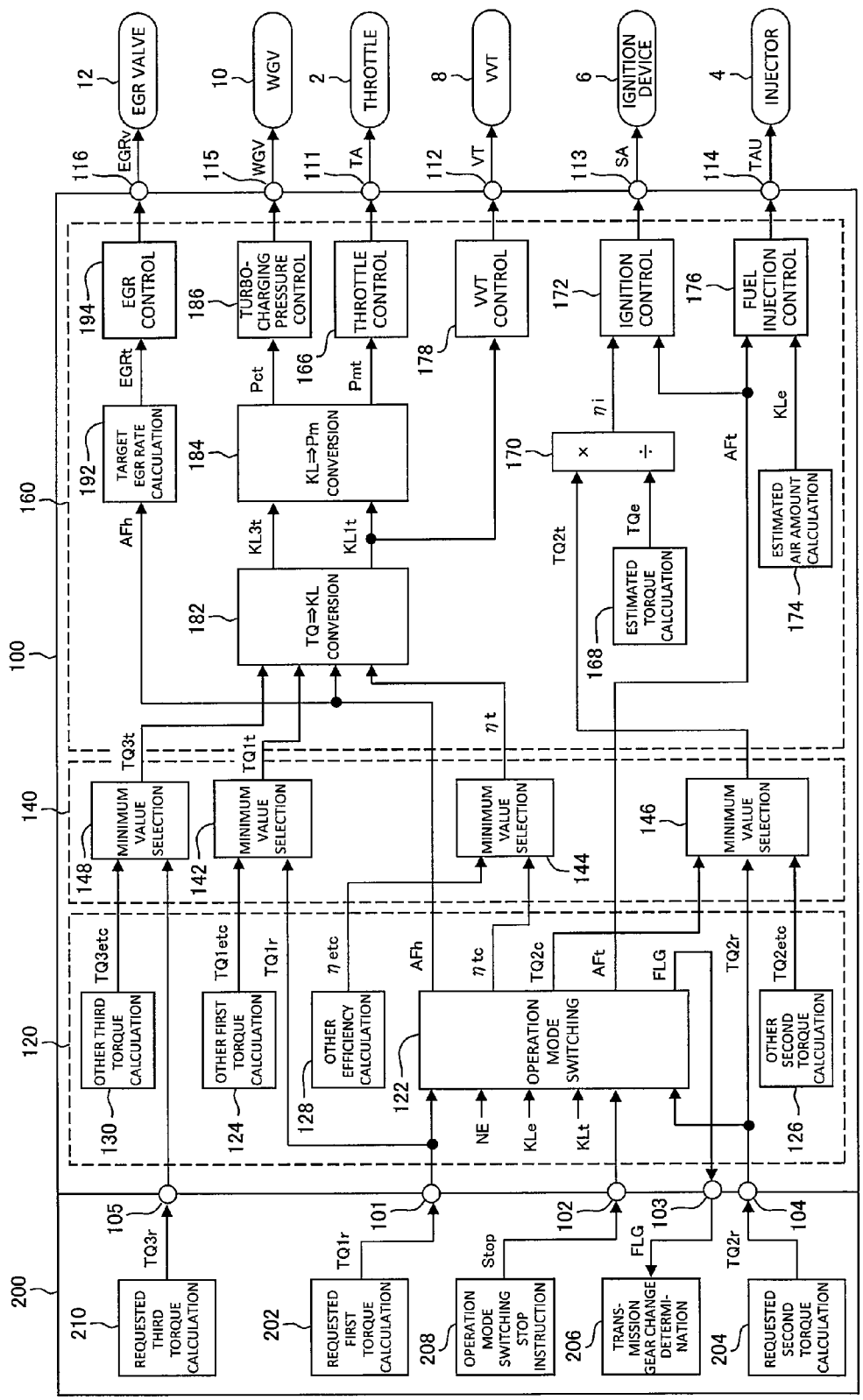
FIG. 7 is a block diagram illustrating a logic of a controlling device according to a third embodiment of the present invention.

In FIG. 7, a logic of the ECU according to the present embodiment is illustrated in a block diagram. The ECU includes the engine controller 100 and the powertrain manager 200. In the block illustrating the powertrain manager 200, various functions with which the powertrain manager 200 is equipped are expressed by blocks. Among the blocks, blocks representing the functions common to the functions of the ECU according to the first embodiment are assigned with common reference signs. Further, in the block representing the engine controller 100, among various functions with which the engine controller 100 is equipped, functions relating to the coordinated operations of the actuators are represented by blocks. Among the blocks, blocks representing common functions to the functions of the ECU according to the first embodiment are assigned with common reference signs. Hereunder, a difference from the first embodiment, that is, the blocks representing the functions peculiar to control of the turbocharging lean-burn engine will be mainly described.

The powertrain manager 200 according to the present embodiment is equipped with an arithmetic unit 210 in addition to the arithmetic units 202, 204, 206 and 208 which are common to the first embodiment. The arithmetic unit 210 calculates a requested third torque and sends the requested third torque to the engine controller 100. In FIG. 7, the requested third torque is described as "TQ3r". A third torque is a torque that is required from the engine regularly or for a long time period similarly to the first torque. A relation between the third torque and the first torque is analogous to the relation between the first torque and the second torque. That is to say, in a case of being seen from the side of the first torque, the first torque is a kind of torque that has higher urgency or priority than the third torque, and requests a high responsiveness from the engine, that is, a kind of torque which is required to be realized earlier. The requested third torque is a requested value of the third torque which the powertrain manager 200 requests from the engine. Listing the three kinds of requested torques which are calculated in the powertrain manager 200 in sequence from the highest urgency or priority, that is, the highest responsiveness requested from the engine, the ranking of the kinds is such that the requested second torque, the requested first torque and the requested third torque. The arithmetic unit 210 calculates the requested third torque based on the signal that responds to the degree of accelerator pedal opening. In the present embodiment, the requested third torque as well as the requested first torque corresponds to the requested torque in the present invention. A torque obtained by removing a pulse component in a temporary torque reduction direction from the requested first torque can be also set as the requested third torque.

The engine controller 100 according to the present embodiment is configured by the three large arithmetic units 120, 140 and 160 similarly to the first embodiment. The large arithmetic unit 120 is equipped with an arithmetic unit 130 in addition to the arithmetic units 122, 124, 126 and 128 common to the first embodiment. The arithmetic unit 130 calculates, as a control parameter for the engine, a torque classified into the third torque, among the torques required to keep the present operating state of the engine or realize a predetermined operating state which is scheduled. Here, the torque that is calculated in the arithmetic unit 130 is referred to as "other third torque". In FIG. 7, the other third torque is described as "TQ3etc". The arithmetic unit 130 outputs a valid value only when such a torque is actually required, and calculates an invalid value while such a torque is not required. The invalid value is set at a value larger than a maximum indicated torque that can be outputted by the engine.

The large arithmetic unit 140 according to the present embodiment is equipped with an arithmetic unit 148 in addition to the arithmetic units 142, 144 and 146 common to the first embodiment. The arithmetic unit 148 is configured to perform a mediation process with respect to the third torque. The requested third torque and the other third torque are inputted to the arithmetic unit 148. The arithmetic unit 148 performs a mediation process with respect to them, and outputs a torque obtained by performing the mediation process as the finally determined target third torque. In FIG. 7, the finally determined target third torque is described as "TQ3t". As the mediation method in the arithmetic unit 148, minimum value selection is used. Accordingly, when the valid value is not outputted from the arithmetic unit 130, the requested third torque which is provided by the powertrain manager 200 is calculated as the target third torque.

The large arithmetic unit 160 according to the present embodiment deals all of the target first torque, the target second torque and the target third torque which are inputted from the large arithmetic unit 140 as the target values of the torque for the engine. Therefore, the large arithmetic unit 160 according to the present embodiment includes an arithmetic unit 182 in place of the arithmetic unit 162 according to the first embodiment, and includes an arithmetic unit 184 in place of the arithmetic unit 164 according to the first embodiment.

The target first torque and the target third torque are inputted to the arithmetic unit 182, and the target efficiency and the virtual air-fuel ratio are further inputted to the arithmetic unit 182. The arithmetic unit 182 corresponds to the target air amount calculation means in the present invention. The arithmetic unit 182 calculates a target air amount for achieving the target first torque (hereunder, referred to as a target first air amount) backwards from the target first torque by using the target efficiency and the virtual air-fuel ratio, by the common method to the arithmetic unit 162 according to the first embodiment. In FIG. 7, the target first air amount is described as "KL1t". In the present embodiment, the target first air amount is used in calculation of the target valve timing by the arithmetic unit 178.

Further, in parallel with the calculation of the target first air amount, the arithmetic unit 182 calculates a target air amount for achieving the target third torque (hereunder referred to as a target third air amount) backwards from the target third torque by using the target efficiency and the virtual air-fuel ratio. In FIG. 7, the target third air amount is described as "KL3t". In the calculation of the target third air amount, the target efficiency and the virtual air-fuel ratio are also used as parameters that provide a conversion efficiency of the air amount to torque. If the value of the virtual air-fuel ratio is changed as in the first embodiment in the calculation of the target first air amount, the value of the virtual air-fuel ratio is also changed similarly in the calculation of the target third air amount.

The arithmetic unit 184 calculates the target intake pipe pressure backwards from the target first air amount by the common method to the arithmetic unit 164 according to the first embodiment. In the drawings, the target intake pipe pressure is described as "Pmt". The target intake pipe pressure is used in calculation of the target degree of throttle opening by the arithmetic unit 166.

Further, in parallel with the calculation of the target intake pipe pressure, the arithmetic unit 184 calculates a target turbocharging pressure backwards from the target third air amount. In FIG. 7, the target turbocharging pressure is described as "Pct". In the calculation of the target turbocharging pressure, first of all, the target third air amount is converted to the intake pipe pressure by the common method to the case of calculating the target intake pipe pressure. Subsequently, a reserve pressure is added to the intake pipe pressure which is obtained by converting the target third air amount, and a total value thereof is calculated as the target turbocharging pressure. The reserve pressure is a minimum margin of the turbocharging pressure to the intake pipe pressure. Note that the reserve pressure may have a fixed value, but can be changed by being interlocked with the intake pipe pressure, for example.

The large arithmetic unit 160 according to the present embodiment is further equipped with an arithmetic unit 186. The arithmetic unit 186 calculates a target degree of wastegate valve opening that is a target value of a degree of wastegate valve opening based on the target turbocharging pressure. In FIG. 7, the target degree of wastegate valve opening is described as "WGV". In the calculation of the target degree of wastegate valve opening, a map or a model in which the turbo charging pressure and the degree of wastegate valve opening are related is used. The target degree of wastegate valve opening which is calculated in the arithmetic unit 186 is converted to a signal to drive the WGV 10 and is sent to the WGV 10 through the interface 115 of the ECU. The arithmetic unit 186 also corresponds to the first actuator control means in the present invention. Note that as an operation amount of the WGV 10, a duty ratio of a solenoid that drives WGV 10 may be adopted, instead of the degree of wastegate valve opening.

Figure 8:
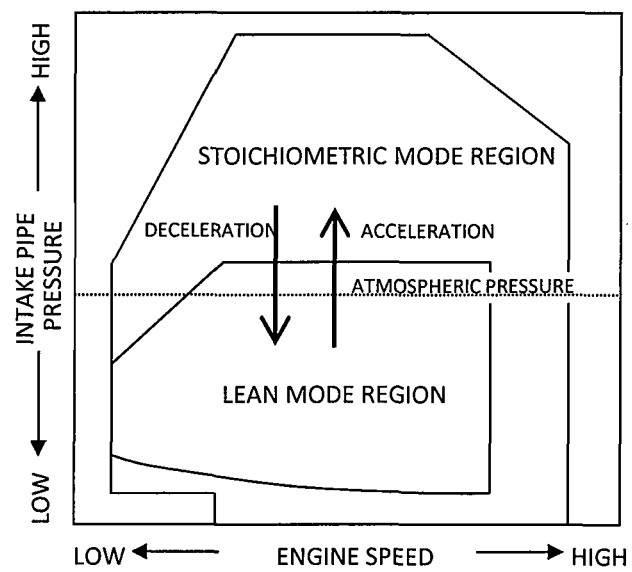
FIG. 8 is a diagram illustrating settings of operation ranges that are adopted in the controlling device according to the third embodiment of the present invention.

According to the ECU which is configured as above, by performing coordinated operations of the plurality of actuators 2, 4, 6, 8, 10 and 12 including the WGV 10, the problem of switching the air-fuel ratio with a high responsiveness while smoothly changing the torque in accordance with the request of the driver, and controlling the EGR rate with a high responsiveness can be also achieved in also the turbocharging lean-burn engine. Note that FIG. 8 illustrates settings of the operating ranges in the present embodiment. The operating ranges are defined by the intake pipe pressure and engine speed. According to FIG. 8, a lean mode region in which the lean mode is selected is set in a low-to-medium speed and low-to-medium load region. From FIG. 8, it is found out that at the time of acceleration, the operation mode is switched from the stoichiometric mode to the lean mode, and at the time of deceleration, the operation mode is switched from the lean mode to the stoichiometric mode. Further, from FIG. 8, it is also found out that a region in which the lean mode is selected also exists in a turbocharging region in which the intake pipe pressure becomes higher than the atmospheric pressure. The settings of the operating ranges as shown in FIG. 8 are mapped and stored in the ECU. The ECU executes switching of the operation mode in accordance with the map.

[Others]

The present invention is not limited to the aforementioned embodiments, and can be carried out by being modified variously within the range without departing from the gist of the present invention. For example, modifications as follows may be adopted.

The air-fuel ratio (virtual air-fuel ratio) that is used for calculating a target air amount in the first embodiment can be replaced with an equivalence ratio. The equivalence ratio is also a parameter that provides a conversion efficiency of the air amount to torque, and corresponds to a parameter that corresponds to the air-fuel ratio. Likewise, an excess air factor can be used as a parameter that provides a conversion efficiency of the air amount to torque.

As the parameter for use in the calculation of the target air amount, a parameter corresponding to the ignition timing can be also used. As the ignition timing is retarded more from the optimal ignition timing, the torque which is generated with the same air amount becomes lower, and therefore, the parameter corresponding to the ignition timing corresponds to a parameter which provides a conversion efficiency of the air amount to torque. For example, a torque-air amount conversion map which is used in the calculation of the target air amount is prepared at each ignition timing, and the value of the ignition timing that is used in search of the map can be changed in response to switching of the operation mode. More specifically, at the time of deceleration when the requested first torque decreases, the ignition timing which is used to search the map is set as the optimal ignition timing in a period in which the requested first torque is larger than the reference value, and the ignition timing which is used to search the map is retarded from the optimal ignition timing in response to decrease of the requested torque to the reference value or smaller. In this case, the air-fuel ratio which is used to search the map is the target air-fuel ratio.

A variable lift amount mechanism that makes a lift amount of the intake valve variable can also be used as a first actuator that changes the amount of air drawn into the cylinders. The variable lift amount mechanism can be used in combination with another first actuator such as the throttle or VVT.

A variable nozzle can also be used as a first actuator that changes a supercharging property of the turbocharger. Further, if the turbocharger is assisted by an electric motor, the electric motor can also be used as a third actuator.

In the embodiment of the present invention, an injector as the second actuator is not limited to a port injector. An in-cylinder injector that injects fuel directly into the combustion chamber can also be used, and both a port injector and an in-cylinder injector may also be used in combination.

The first air-fuel ratio is not limited to the theoretical air-fuel ratio. The first air-fuel ratio can also be set to an air-fuel ratio that is leaner than the theoretical air-fuel ratio, and an air-fuel ratio that is leaner than the first air-fuel ratio can be set as the second air-fuel ratio.

REFERENCE SIGNS LIST

2 Throttle
4 Injector
6 Ignition device
8 Variable valve timing mechanism
10 Wastegate valve
12 EGR valve
100 Engine controller
101 Interface as requested torque receiving means
200 Powertrain manager
162; 182 Arithmetic unit as target air amount calculation means
164, 166; 178 Arithmetic unit as first actuator control means
174, 176 Arithmetic unit as second actuator control means
168, 170, 172 Arithmetic unit as third actuator control means
192, 196 Arithmetic unit as target EGR rate calculation means
194 Arithmetic unit as fourth actuator control means
404 Arithmetic unit as virtual air-fuel ratio changing means
406 Arithmetic unit as target air-fuel ratio switching means

The invention claimed is:

1. A controlling device for an internal combustion engine that has a first actuator that changes an amount of air that is taken into a cylinder, a second actuator that supplies fuel into the cylinder, a third actuator that ignites a mixture gas in the cylinder, and a fourth actuator that regulates an EGR rate, and is configured to be capable of selecting an operation by a first air-fuel ratio and an operation by a second air-fuel ratio that is leaner than the first air-fuel ratio, comprising:
   requested torque reception means for receiving a requested torque;
   target air amount calculation means for calculating a target air amount for achieving the requested torque backwards from the requested torque by using a virtual air-fuel ratio that is a parameter corresponding to an air-fuel ratio;
   virtual air-fuel ratio changing means for switching the virtual air-fuel ratio from the first air-fuel ratio to the second air-fuel ratio in response to decrease of the requested torque to a reference value or smaller;
   target air-fuel ratio switching means for switching a target air-fuel ratio from the first air-fuel ratio to the second air-fuel ratio, after the virtual air-fuel ratio is changed from the first air-fuel ratio to the second air-fuel ratio;

target EGR rate calculation means for calculating a target EGR rate by using the virtual air-fuel ratio;

first actuator control means for determining an operation amount of the first actuator based on the target air amount, and operating the first actuator in accordance with the operation amount;

second actuator control means for determining a fuel supply amount based on the target air-fuel ratio, and operating the second actuator in accordance with the fuel supply amount;

third actuator control means for determining an ignition timing for achieving the requested torque based on a torque that is estimated from the operation amount of the first actuator and the target air-fuel ratio, and the requested torque, and operating the third actuator in accordance with the ignition timing; and fourth actuator control means for determining an operation amount of the fourth actuator based on the target EGR rate, and operating the fourth actuator in accordance with the operation amount.

2. The controlling device for an internal combustion engine according to claim 1, wherein the target EGR rate calculation means includes:

first target value calculation means for calculating a first target value of an EGR rate by using the virtual air-fuel ratio;

second target value calculation means for calculating a second target value of the EGR rate by using the target air-fuel ratio; and selection means for comparing the first target value and the second target value, and selecting a smaller one of the first target value and the second target value as the target EGR rate.

3. The controlling device for an internal combustion engine according to claim 1, wherein the target air-fuel ratio switching means switches the target air-fuel ratio from the first air-fuel ratio to the second air-fuel ratio, after a difference between the target air amount and an air amount that is estimated from the operation amount of the first actuator becomes equal to or smaller than a threshold value, after the virtual air-fuel ratio is changed from the first air-fuel ratio to the second air-fuel ratio.

4. The controlling device for an internal combustion engine according to claim 1, wherein the target air-fuel ratio switching means switches the target air-fuel ratio from the first air-fuel ratio to the second air-fuel ratio, after a fixed time period elapses, after the virtual air-fuel ratio is changed from the first air-fuel ratio to the second air-fuel ratio.

5. The controlling device for an internal combustion engine according to claim 1, wherein the fourth actuator includes an EGR valve, and the fourth actuator control means determines a target degree of EGR valve opening based on the target EGR rate, and operates the EGR valve in accordance with the target degree of EGR valve opening.

6. The controlling device for an internal combustion engine according to claim 1, wherein the first actuator includes a throttle, and the first actuator control means determines a target degree of throttle opening based on a target intake pipe pressure that is calculated from the target air amount, and operates the throttle in accordance with the target degree of throttle opening.

7. The controlling device for an internal combustion engine according to claim 1, wherein the first actuator includes a variable valve timing mechanism that changes a valve timing of an intake valve, and the first actuator control means determines a target valve timing based on the target air amount, and operates the variable valve timing mechanism in accordance with the target valve timing.

8. The controlling device for an internal combustion engine according to claim 1, wherein the internal combustion engine is a turbocharging engine comprising a turbocharger, the first actuator includes a turbocharging property variable actuator that changes a turbocharging property of the turbocharger, and the first actuator control means determines an operation amount of the turbocharging property variable actuator based on a target turbocharging pressure that is calculated from the target air amount, and operates the turbocharging property variable actuator in accordance with the operation amount.

9. A controlling device for an internal combustion engine that has a first actuator that changes an amount of air that is taken into a cylinder, a second actuator that supplies fuel into the cylinder, a third actuator that ignites a mixture gas in the cylinder, and a fourth actuator that regulates an EGR rate, and is configured to be capable of selecting an operation by a first air-fuel ratio and an operation by a second air-fuel ratio that is leaner than the first air-fuel ratio, comprising an engine controller programmed to:

receive a requested torque;

calculate a target air amount for achieving the requested torque backwards from the requested torque by using a virtual air-fuel ratio that is a parameter corresponding to an air-fuel ratio;

switch the virtual air-fuel ratio from the first air-fuel ratio to the second air-fuel ratio in response to decrease of the requested torque to a reference value or smaller;

switch a target air-fuel ratio from the first air-fuel ratio to the second air-fuel ratio, after the virtual air-fuel ratio is changed from the first air-fuel ratio to the second air-fuel ratio;

calculate a target EGR rate by using the virtual air-fuel ratio;

determine an operation amount of the first actuator based on the target air amount, and operate the first actuator in accordance with the operation amount;

determine a fuel supply amount based on the target air-fuel ratio, and operate the second actuator in accordance with the fuel supply amount;

determine an ignition timing for achieving the requested torque based on a torque that is estimated from the operation amount of the first actuator and the target air-fuel ratio, and the requested torque, and operate the third actuator in accordance with the ignition timing; and determine an operation amount of the fourth actuator based on the target EGR rate, and operate the fourth actuator in accordance with the operation amount.

* * * * *